(12) United States Patent
Takeuchi et al.

(10) Patent No.: US 11,945,285 B2
(45) Date of Patent: Apr. 2, 2024

(54) AIR DISCHARGE DEVICE

(71) Applicant: DENSO CORPORATION, Kariya (JP)

(72) Inventors: Yasuhiro Takeuchi, Nisshin (JP);
Etsuro Yoshino, Nisshin (JP); Yuuji Okamura, Kariya (JP); Jun Yamaoka, Kariya (JP); Masaharu Sakai, Kariya (JP); Yusuke Komatsubara, Kariya (JP); Yasuhiko Niimi, Kariya (JP); Tatsuya Yoshida, Kariya (JP); Hidetaka Nomoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 17/343,118

(22) Filed: Jun. 9, 2021

(65) Prior Publication Data
US 2021/0291630 A1 Sep. 23, 2021

Related U.S. Application Data

(63) Continuation of application No. PCT/JP2019/045668, filed on Nov. 21, 2019.

(30) Foreign Application Priority Data

Dec. 25, 2018 (JP) ................. 2018-240804
Jul. 19, 2019 (JP) ................. 2019-133463

(51) Int. Cl.
*B60H 1/34* (2006.01)
*B60H 1/00* (2006.01)

(52) U.S. Cl.
CPC ....... *B60H 1/3457* (2013.01); *B60H 1/00564* (2013.01)

(58) Field of Classification Search
CPC ............ B60H 1/3457; B60H 1/00564; B60H 1/00021; B60H 2001/00092; F24F 13/06; F24F 13/072; F24F 13/08
(Continued)

(56) References Cited

U.S. PATENT DOCUMENTS

| 4,919,328 A | 4/1990 | Hara et al. |
| 2006/0030256 A1 | 2/2006 | Kamano et al. |

(Continued)

FOREIGN PATENT DOCUMENTS

| CN | 2296169 Y | 11/1998 | |
| DE | 202010010428 U1 * | 11/2010 | ............ B60H 1/345 |

(Continued)

*Primary Examiner* — Allen R. B. Schult
(74) *Attorney, Agent, or Firm* — Harness, Dickey & Pierce, P.L.C.

(57) ABSTRACT

The air discharge device includes a duct defining: a main flow path through which an air flow passes; and a main hole opened in a flat shape to discharge the air flow as a working air flow toward a downstream from the main flow path. A throttle portion is provided in the duct to reduce a flow path height of the main flow path from an upstream of the air flow toward a downstream of the air flow. A plurality of partitions are arranged to divide the main flow path in a major direction into a pair of side flow paths and at least one center flow path. The plurality of partitions are disposed in the duct such that a flow path width of the center flow path is reduced from the upstream of the air flow toward the downstream of the air flow.

15 Claims, 17 Drawing Sheets

(58) Field of Classification Search
USPC .......................................................... 454/152
See application file for complete search history.

(56) References Cited

U.S. PATENT DOCUMENTS

| | | | | |
|---|---|---|---|---|
| 2011/0039491 A1* | 2/2011 | Khalifa | ................... | F24F 13/04 |
| | | | | 454/305 |
| 2015/0300385 A1 | 10/2015 | Akagi et al. | | |
| 2019/0242662 A1 | 8/2019 | Goto et al. | | |

FOREIGN PATENT DOCUMENTS

| | | |
|---|---|---|
| JP | S59009912 U | 1/1984 |
| JP | H1240314 A | 9/1989 |
| JP | H0825954 A | 1/1996 |
| JP | 2005343197 A | 12/2005 |
| JP | 2007255879 A | 10/2007 |
| JP | 2008185313 A | 8/2008 |
| JP | 2011168140 A | 9/2011 |
| JP | 2016033441 A | 3/2016 |
| JP | 201713783 A | 1/2017 |
| JP | 2018204939 A | 12/2018 |
| WO | WO-2014017208 A1 | 1/2014 |

* cited by examiner

AIR DISCHARGE DEVICE

CROSS REFERENCE TO RELATED APPLICATION

The present application is a continuation application of International Patent Application No. PCT/JP2019/045668 filed on Nov. 21, 2019, which designated the U.S. and claims the benefit of priority from Japanese Patent Application No. 2018-240804 filed on Dec. 25, 2018 and Japanese patent application No. 2019-133463 filed on Jul. 19, 2019. The entire disclosure of the above application is incorporated herein by reference.

TECHNICAL FIELD

The present disclosure relates to an air discharge device including a discharge unit configured to discharge an air flow.

BACKGROUND

In a known air conditioner, a partition plate is provided in an air discharge duct to divide a main flow path having a common width and a sub flow path outside the main flow path from each other, and a width of the main flow path is set in a predetermined range, so as to extend a reaching distance of the air flow discharged from the air conditioner.

SUMMARY

An air discharge device in one exemplar according to the present disclosure includes a duct defining a main flow path through which an air flow passes, and a main hole having an opening opened in a flat shape to discharge the air flow as a working air flow toward a downstream from the main flow path. A throttle portion is provided in the duct to reduce a flow path height of the main flow path from an upstream of the air flow toward the downstream of the air flow. A plurality of partitions are arranged to divide the main flow path into a pair of side flow paths located at both sides in a major direction, and at least one center flow path located between the pair of side flow paths. The plurality of partitions are disposed in the duct such that a flow path width of the center flow path is reduced from the upstream of the air flow toward the downstream of the air flow.

BRIEF DESCRIPTION OF DRAWINGS

The objects, features and advantages of the present disclosure will become more apparent from the following detailed description made with reference to the accompanying drawings.

DETAILED DESCRIPTION

Figure 1:
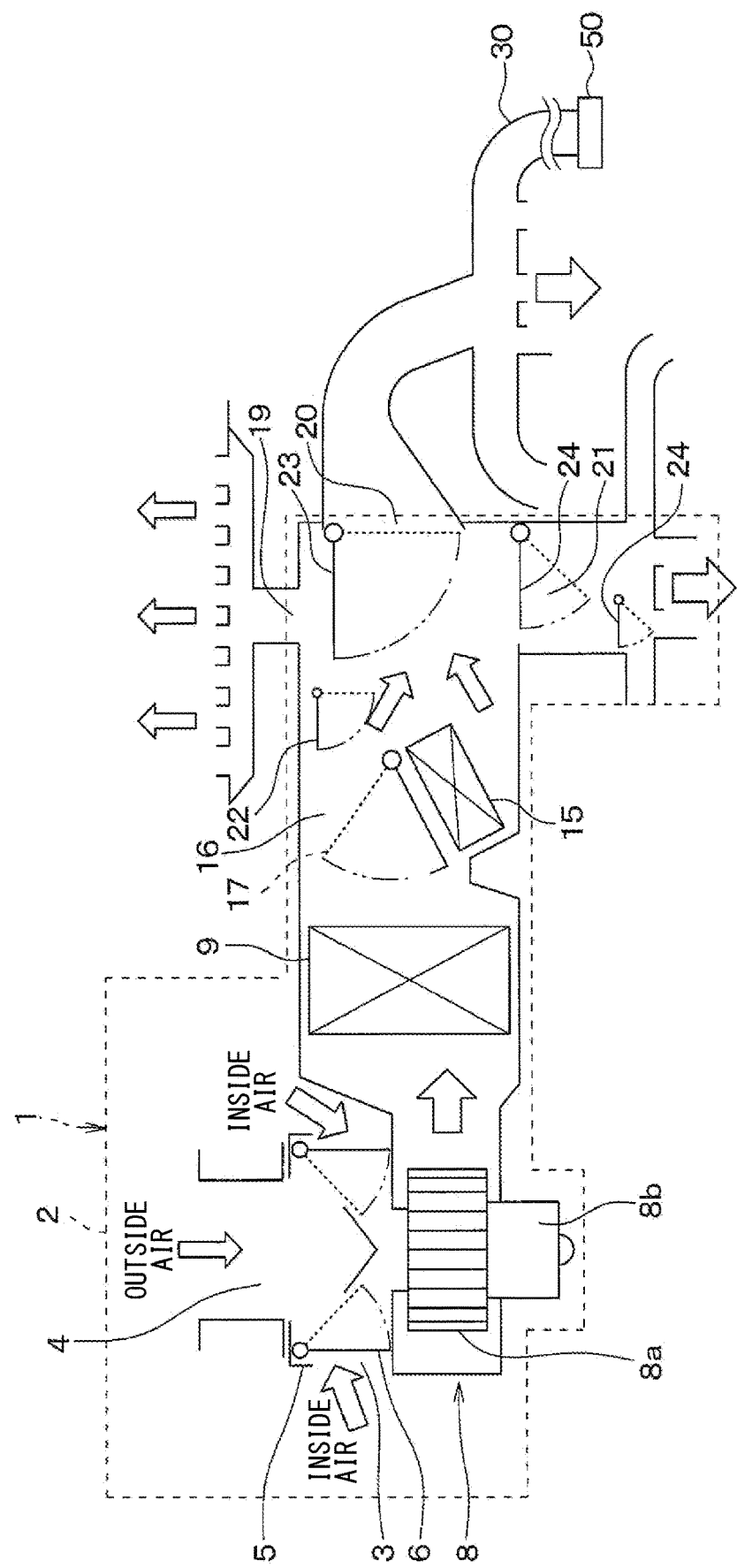
FIG. 1 is a schematic diagram of a vehicle air conditioner using an air discharge device according to a first embodiment.

A partition plate may be provided in an air discharge device to divide a main flow path having a common width and a sub flow path outside the main flow path from each other, and a width of the main flow path may be set in a predetermined range.

The present inventors studied an opening of an air outlet which has a flat shape. According to the study of the present inventors, air is easily diffused in a minor direction of the air outlet compared to that in a major direction of the air outlet, and it is difficult to increase a reaching distance of a discharged air.

An object of the present disclosure is to provide an air discharge device configured to increase a reaching distance of working air discharged from a duct.

An air discharge device in one exemplar according to the present disclosure includes a duct defining a main flow path through which an air flow passes, and a main hole having an opening opened in a flat shape and configured to discharge the air flow as a working air flow toward a downstream from the main flow path. Here, the opening of the main hole has a flow path height in a minor direction of the flat shape and a flow path width in a major direction of the flat shape. A throttle portion is provided in the duct to reduce the flow path height of the main flow path from an upstream of the air flow toward the downstream of the air flow. A plurality of partitions is arranged to divide the main flow path in the major direction, into a pair of side flow paths located at both sides in the major direction, and at least one center flow path located between the pair of side flow paths. The plurality of partitions are disposed in the duct, and the flow path width of the center flow path is reduced from the upstream of the air flow toward the downstream of the air flow.

Compared to a configuration in which the duct does not include the throttle portion, in the configuration in which the throttle portion configured to reduce the flow path height of the main flow path is provided in the duct, an air velocity distribution of the working air is equalized in the minor direction of the opening of the main hole. When the air velocity distribution of the working air is equalized, a velocity boundary layer of the working air discharged from the main hole is easily away from a central line of the working air. Because of this, the working air is restricted from being diffused in the minor direction of the opening of the main hole, when discharged.

The flow path width of the center flow path is gradually reduced by the multiple partitions from the upstream of the air flow toward the downstream of the air flow. In this configuration, the air easily flows through the center flow path, and the air discharged from the center flow path flows at a velocity higher than that of the air flow discharged through the side flow path.

As a result, in the center flow path, the air velocity distribution of the working air discharged from the main hole has a convex shape and is extended in the minor direction of the opening of the main hole, and the velocity boundary layer of the working air discharged from the main hole is easily away from the center of the working air. Therefore, when discharged, the working air is restricted from being diffused in the minor direction of the opening of the main hole.

In the air discharge device of the present disclosure including the above configurations, the working air is restricted from being diffused in the minor direction when discharged. Therefore, even when a main hole formed in a flat shape is employed as an air outlet, the reaching distance of the working air can be increased.

Hereinafter, embodiments of the present disclosure will be described with reference to the drawings. In the following embodiments, parts which are the same as or equivalent to those described in the preceding embodiment(s) will be indicated by the same reference signs, and the description thereof may be omitted. Also, when only a part of constituent elements are described in the embodiments, constituent elements described in the preceding embodiments are applicable to other parts of the constituent elements. The respective embodiments described herein may be partially combined with each other as long as no particular problems are caused even without explicit statement of these combinations.

First Embodiment

A first embodiment in the present disclosure will be described with reference to FIGS. 1 to 12. As shown in FIG. 1, an air discharge device 50 is connected to an indoor air conditioning unit 1 configured to perform air conditioning of a vehicle, through a duct 30.

The indoor air conditioning unit 1 is disposed inside an instrument panel at a front area in a passenger compartment. The indoor air conditioning unit 1 includes a case 2 which forms an outer shell of the indoor air conditioning unit 1. An air path is formed inside the case 2 so as to send air toward the passenger compartment.

An inside-outside air switching box 5 is disposed most upstream of the air path of the case 2 and includes an inside air introduction port 3 and an outside air introduction port 4. An inside-outside air switching door 6 is disposed in the inside-outside air switching box 5 and configured to rotate. The inside-outside air switching door 6 is configured to switch between an inside air mode and an outside air mode. In the inside air mode, air inside the passenger compartment is introduced from the inside air introduction port 3. In the outside air mode, air outside the passenger compartment is introduced from the outside air introduction port 4. The inside-outside air switching door 6 is driven by an unillustrated servomotor.

A blower 8 of an electric powered type is disposed downstream of the inside-outside air switching box 5 and is configured to generate an air flow passing into the passenger compartment. The blower 8 includes a blower fan 8a and a motor 8b. The blower fan 8a is a fan in a centrifugal type, and the motor 8b drives the blower fan 8a.

An evaporator 9 is arranged downstream of the blower 8 and is configured to cool air flowing in the case 2. The evaporator 9 is a cooling heat exchanger configured to cool blown air blown by the blower 8. The evaporator 9 is one of the elements included in a known vapor-compression refrigeration cycle.

In the indoor air conditioning unit 1, a heater core 15 is disposed downstream from the evaporator 9 and is configured to heat air flowing in the case 2. The heater core 15 is a heating heat exchanger configured to heat cold air having passed through the evaporator 9 by using warm water of a vehicle engine as a heat source. A bypass passage 16 is formed at a side of the heater core 15 such that bypass air which bypasses the heater core 15 flows through the bypass passage 16.

An air mix door 17 is arranged rotatably between the evaporator 9 and the heater core 15. The air mix door 17 is driven by an unillustrated servomotor, and an opening degree of the air mix door 17 is continuously adjustable. Depending on the opening degree of the air mix door 17, a ratio of a warm air volume, which is a volume of warm air passing through the heater core 15, to a cold air volume, which is a volume of cold air passing through the bypass passage 16 while bypassing the heater core 15, is adjusted. As a result, a temperature of the air discharged to the passenger compartment is adjusted.

A defroster outlet 19, a face air outlet 20, and a foot air outlet 21 are arranged most downstream of the air path in the case 2. Conditioned air is discharged through the defroster air outlet 19 toward a window glass at a front of the vehicle, through the face air outlet 20 toward a face of an occupant, or through the foot air outlet 21 toward a foot of the occupant.

A defroster door 22, a face door 23, and a foot door 24 are arranged upstream from the outlets 19, 20, 21, respectively, and configured to rotate. The doors 22, 23, 24 are operated to open or close by a common servomotor through an unillustrated link mechanism.

Generally, the instrument panel is required to be thinned in an up-down direction of the vehicle due to a viewpoint of enlargement of the passenger compartment or design. In addition, in the instrument panel, a large-sized information device tends to be installed at a center portion in a vehicle width direction or at a portion facing the occupant in a vehicle front-back direction. The large-sized information device is configured to inform various information showing a driving state of the vehicle.

Therefore, in the indoor air conditioning unit 1, a countermeasure such as for reducing a width of an air outlet becomes thinner is required. However, if the width of the air outlet becomes thinner, a core portion of the air flow discharged from the air outlet is easily disturbed because of a transverse vortex generated downstream of the air outlet. As a result, a reaching distance of the air flow discharged into the passenger compartment is reduced.

In the indoor air conditioning unit 1 of the present embodiment, the air discharge device 50 is connected to the face air outlet 20 arranged in the case 2 through the duct 30 to enhance the reaching distance of the air flow. The conditioned air in which a temperature had been adjusted in the indoor air conditioning unit 1 passes from the case 2 to the duct 30 and is blown into the passenger compartment through the air discharge device 50.

Figure 2:
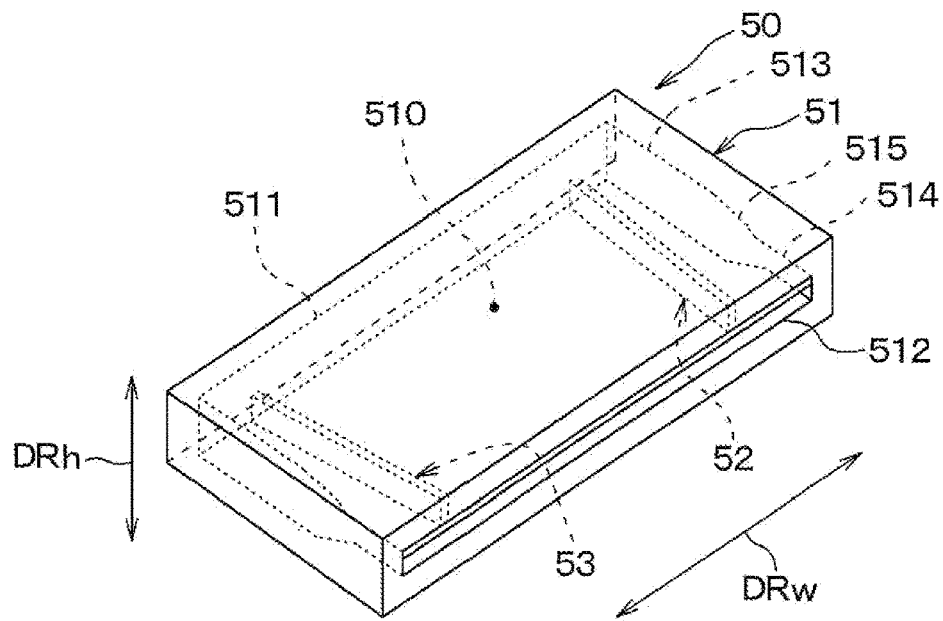
FIG. 2 is a schematic perspective view of the air discharge device according to the first embodiment.

A configuration of the air discharge device 50 will be described with reference to FIGS. 2 to 5. As shown in FIG. 2, the air discharge device 50 includes a duct 51, a first partition 52, and a second partition 53. The duct 51, the first partition 52, and the second partition 53 are made of resin. Although not shown, the indoor air conditioning unit 1 shown in FIG. 1 is connected to the duct 51.

The duct 51 is a flow path forming member that forms a main flow path 510 through which the air passes. The duct 51 has a square tubular shape and a rectangular cross-section. The duct 51 includes an introduction hole 511 upstream of the air flow, and the conditioned air flows into the main flow path 510 through the introduction hole 511.

The duct 51 includes a main hole 512 through which the air is discharged as working air to a downstream of the air flow. An opening direction of the main hole 512 is located such that the working air is discharged to the passenger compartment. The opening direction is a direction normal to a side including an edge of the main hole 512.

Figure 3:
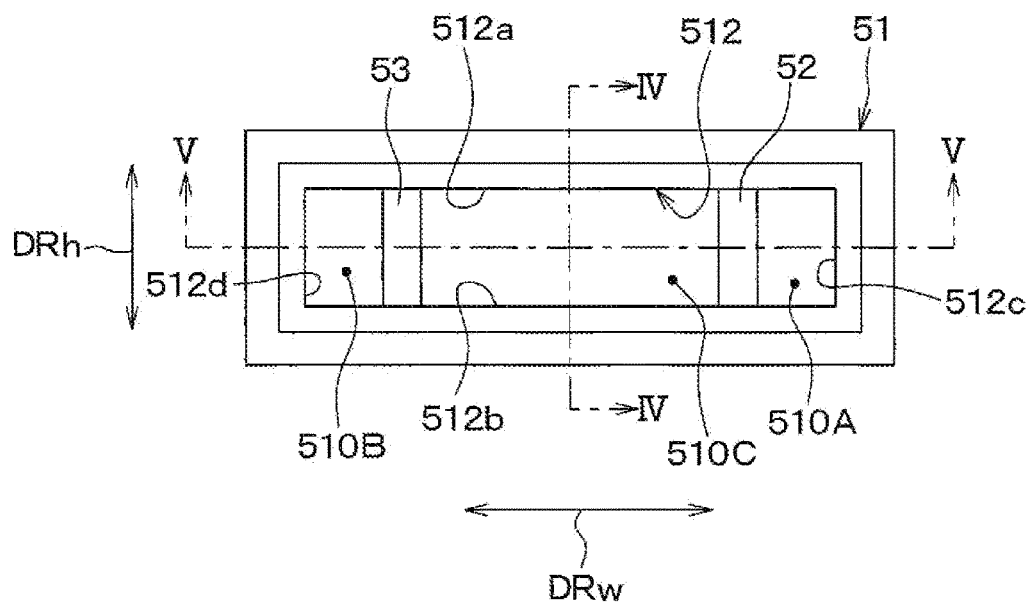
FIG. 3 is a schematic front view of the air discharge device according to the first embodiment.

As shown in FIG. 3, an opening of the main hole 512 has a flat shape. More specifically, the opening of the main hole 512 has a rectangular shape including a pair of long edges 512a, 512b facing each other through a predetermined space and a pair of short edges 512c, 512d connecting the pair of long edges 512a, 512b, respectively. In addition, a distance between the pair of short edges 512c, 512d is larger than a distance between the pair of long edges 512a, 512b.

In the present embodiment, a major direction of the opening of the main hole 512 may be referred to as width direction DRw, and a minor direction of the opening of the main hole 512 may be referred to as height direction DRh. Further, in the present embodiment, a length in the height direction DRh in the main flow path 510 may be referred to as flow path height, and a length in the width direction DRw in the main flow path 510 may be referred to as flow path width. Here, the major direction of the opening of the main hole 512 is a direction in which the pair of long edges 512a, 512b of the main hole 512 extend. In addition, the minor direction of the opening of the main hole 512 is a direction in which the pair of short edges 512c, 512d of the main hole 512 extend.

Figure 4:
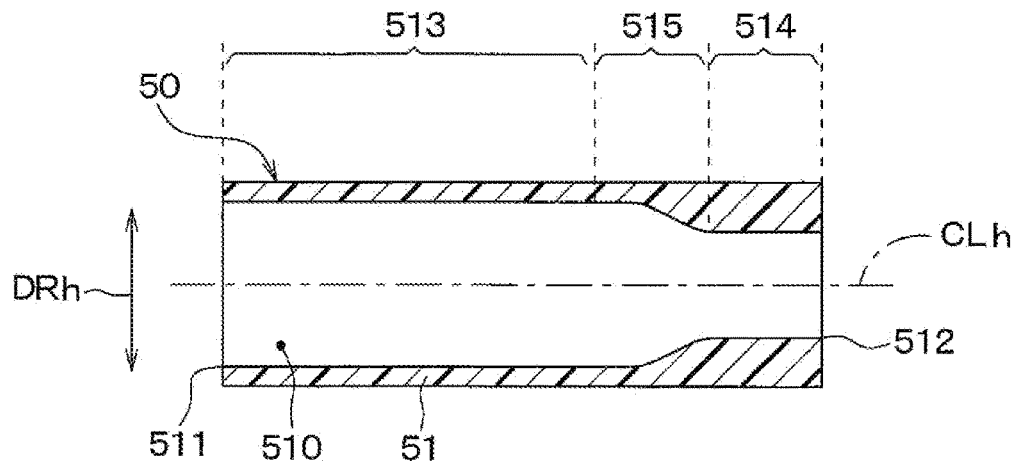
FIG. 4 is a cross-sectional view taken along line IV-IV in FIG. 3.

As shown in FIG. 4, the duct 51 includes an upstream flat portion 513, a downstream flat portion 514, and a throttle portion 515. In the duct 51, at the upstream flat portion 513 and the downstream flat portion 514, the flow path height of the main flow path 510 is substantially constant. At the throttle portion 515, the flow path height of the main flow path 510 is reduced gradually from an upstream of the air flow toward a downstream of the air flow. The throttle portion 515 is arranged between the upstream flat portion 513 and the downstream flat portion 514. The throttle portion 515 is arranged closer to the main hole 512 than the introduction hole 511 in the main flow path 510 so as to generate a contraction flow in a vicinity of the main hole 512. The throttle portion 515 has a curved surface such that a portion connected to the upstream flat portion 513 and a portion connected to the downstream flat portion 514 are rounded.

Figure 5:
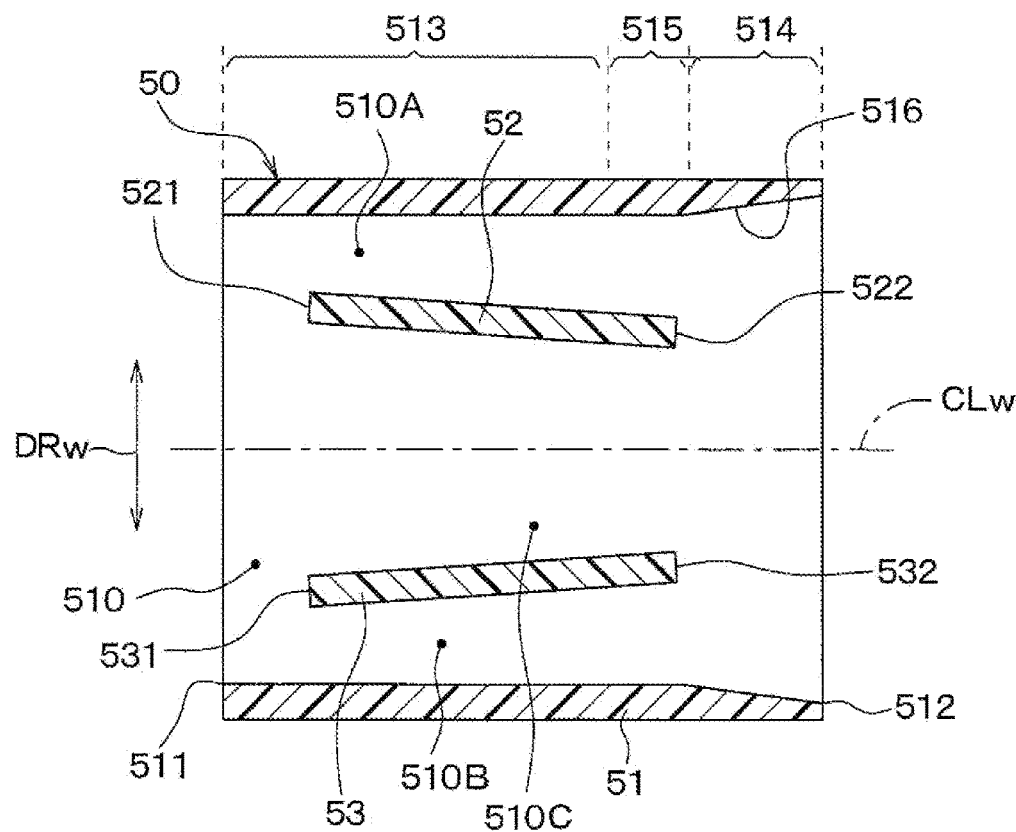
FIG. 5 is a cross-sectional view taken along a line V-V in FIG. 3.

As shown in FIG. 5, in the duct 51, a plurality of partitions such as the first partition 52 and the second partition 53 are arranged and divide the main flow path 510 in the major direction of the opening of the main hole 512 (that is, in the width direction DRw).

Each of the first partition 52 and the second partition 53 is made of a flat plate. Downstream ends 522, 532 provided most downstream of the air flow in the first partition 52 and the second partition 53, respectively, are positioned upstream of the air flow from the opening position of the main hole 512. More specifically, an upstream end 521 of the first partition 52 and an upstream end 531 of the second partition 53 are positioned downstream from an upstream end of the upstream flat portion 513 in the air flow. In addition, the downstream ends 522, 532 are positioned upstream from a downstream end of the throttle portion 515 in the air flow.

The main flow path 510 is divided into a pair of side flow paths 510A, 512B and a center flow path 510C by the first partition 52 and the second partition 53. The side flow paths 510A, 512B are located on both sides of the main flow path 510 in the width direction DRw. The center flow path 510C is located between the side flow path 510A and the side flow path 5106. The air introduced into the main flow path 510 through the introduction hole 511 of the duct 51 is divided and flows into the side flow paths 510A, 510B and the center flow path 510C after being rectified at the main flow path 510.

The first partition 52 and the second partition 53 are arranged such that a flow path width of the center flow path 510C is gradually reduced from the upstream toward the downstream of the air flow. More specifically, the first partition 52 and the second partition 53 are arranged such that a distance between the downstream ends 522, 532 is smaller than a distance between the upstream ends 521, 531. Therefore, a velocity of the air blown from the center flow path 510C is higher than that of the air blown from the side flow path 510A, 510B.

Further, in the duct 51, a width expanding portion 516 is arranged at a portion connected to the main hole 512, and a flow path width of the width enlarging portion 516 is enlarged as toward the downstream of the air flow. The width expanding portion 516 is positioned downstream from the throttle portion 515 and is formed at the downstream flat portion 514.

If the flow path width of the main flow path 510 is extremely large because of the width expanding portion 516, the air flow may be away from a wall surface of the width expanding portion 516. In this case, disturbance caused around the main hole 512 may be increased. Therefore, the width expanding portion 516 is preferred to be structured such that an inclination of the wall surface of the width expanding portion 516 with respect to an opening direction of the main hole 512 is less than or equal to 7°.

Next, air flow in the air discharge device 50 will be described below. First, an air flow in an air discharge device CE, which is a comparative example to the air discharge device 50 of the present embodiment, will be described with reference to FIG. 6. Unlike the air discharge device 50 of the present embodiment, the air discharge device CE of the comparative example does not include the first partition 52, the second partition 53, the throttle portion 515, or the width expanding portion 516, and a flow path area of the main flow path 510 is constant.

Figure 6:
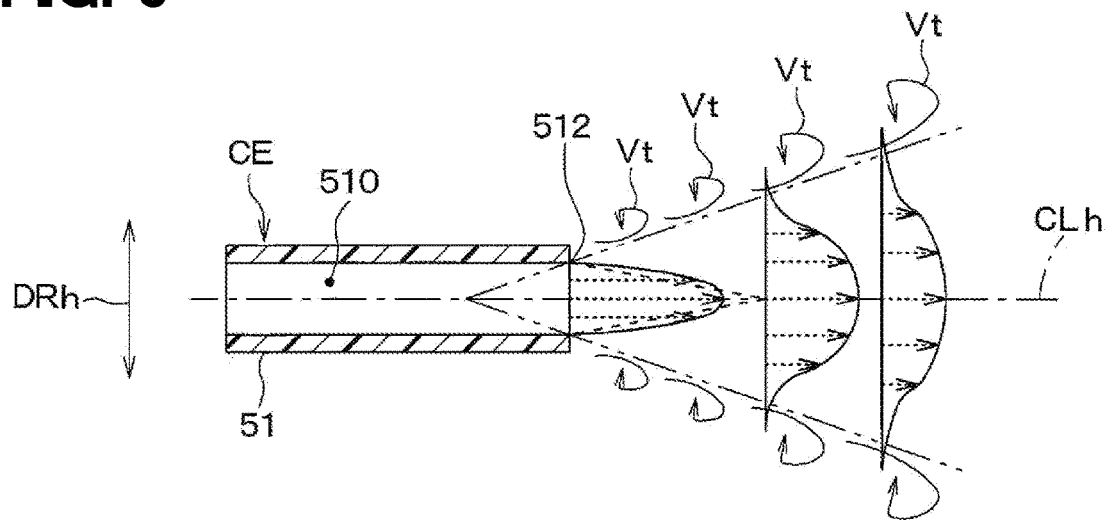
FIG. 6 is an explanatory view for explaining a flow of working air in an air discharge device according to a comparative example.

When the blower 8 of the indoor air conditioning unit 1 starts operating, the air at the conditioned temperature is introduced from the indoor air conditioning unit 1 toward the air discharge device CE through the duct 30. As shown in FIG. 6, in the air discharge device CE of the comparative example, the air introduced into the duct 51 is discharged from the main hole 512 after passing through the main flow path 510. After that, working air discharged from the main hole 512 is distributed in the height direction DRh because of a velocity difference with stationary fluid at an outside, and a reaching distance of the working air becomes shorter.

Figure 7:
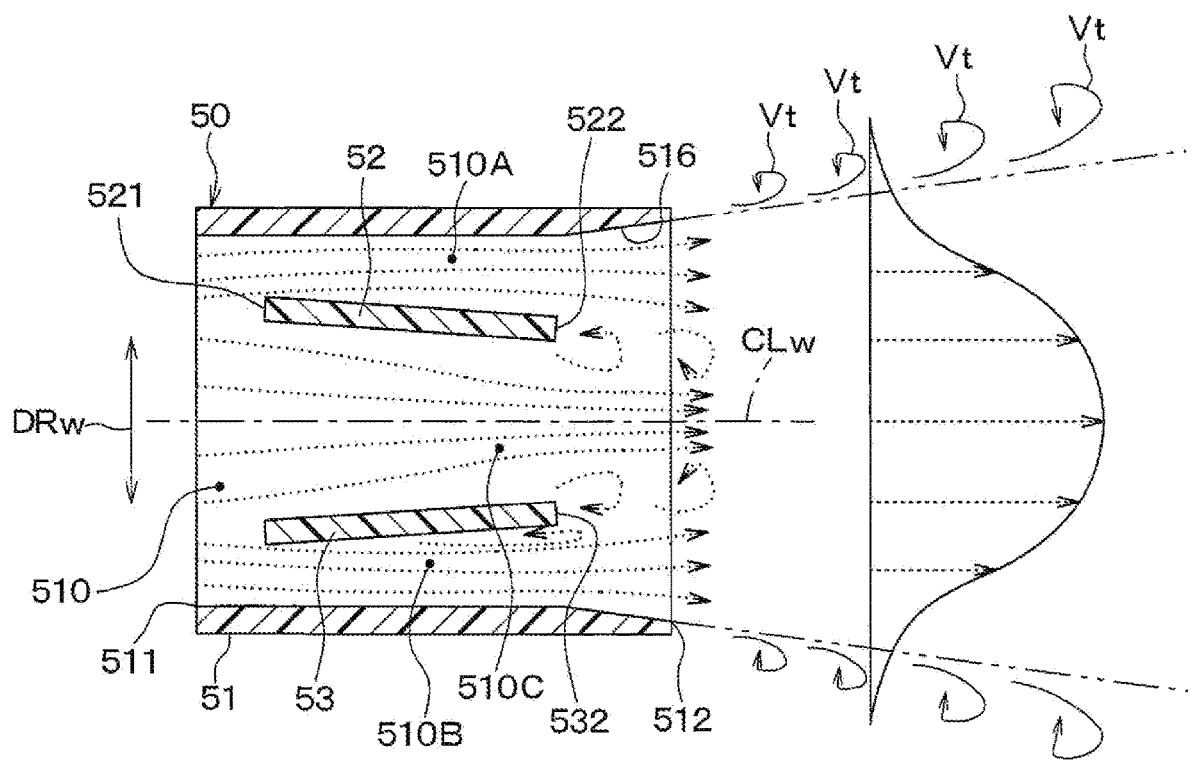
FIG. 7 is an explanatory view for explaining a flow of working air in a direction along a flow path width in the air discharge device according to the first embodiment.

On the other hand, in the air discharge device 50 of the present embodiment, as shown in FIG. 7, the air introduced into the duct 51 is divided and flows into the side flow paths 510A, 510B and the center flow path 510C in the duct 51. The flow path width of the center flow path 510C is reduced toward the downstream of the air flow by the first partition 52 and the second partition 53.

Therefore, a velocity of the air flowing in the center flow path 510C is faster than that of the air discharged from the side flow path 510A, 510B. The air flowing in the center flow path 510C is discharged from the main hole 512 at high velocity.

Further, the air flowing in the side flow path 510A, 510B flows toward the main hole 512 at a velocity lower than that of the air flowing in the center flow path 510C. After that, the air flowing in the side flow path 510A, 510B is discharged from the main hole 512. At this point, the air flowing in the side flow path 510A, 510B flows so as to be away from a central line CLw in the major direction of the opening of the main hole 512 (that is, in the width direction DRw) because of the width expanding portion 516.

Because of this, entrainment of the stationary fluid at the outside of the duct 51 is easily caused at a position away from the central line CLw of the opening of the main hole 512. That is, the transverse vortex Vt generated by a velocity difference with the stationary fluid at the outside of the duct 51 is likely to be generated at the position separated from the center flow path 510C. Here, the transverse vortex is a vortex having a center of the vortex perpendicular to the flow direction of the air flow.

According to this, while the air flowing in the side flow paths 510A, 510B sacrifices, a flow velocity of the working air discharged from the center flow path 510C is restricted from being reduced. Therefore, the reaching distance of the working air can be increased.

In addition, in the air discharge device 50 of the present embodiment, the duct 51 includes the throttle portion 515 which reduces the flow path height of the main flow path 510. Therefore, compared to a configuration in which the duct does not include the throttle portion 515 such as in the comparative example, an air velocity distribution of the working air is equalized in the minor direction of the opening of the main hole 512 (i.e., the height direction DRh).

Figure 8:
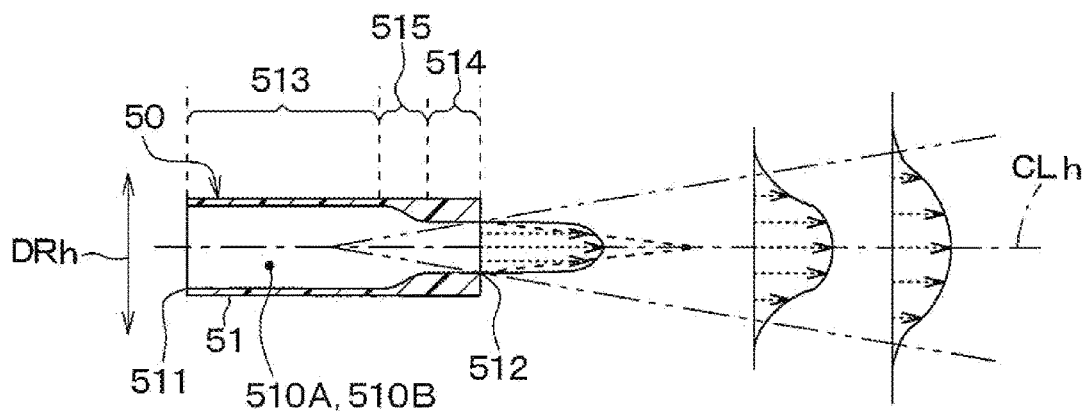
FIG. 8 is an explanatory view for explaining a flow of the working air discharged from a side flow path in the air discharge device according to the first embodiment.
Figure 9:
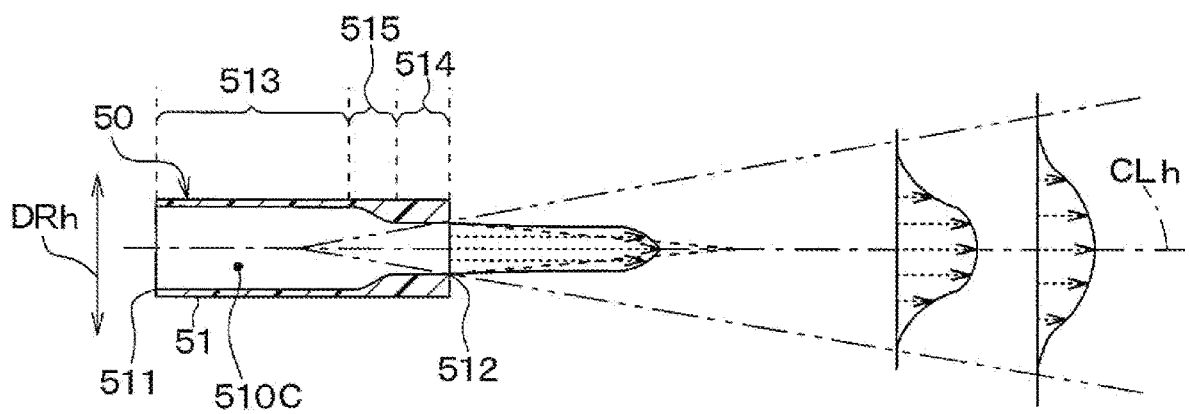
FIG. 9 is an explanatory view for explaining a flow of the working air discharged from a center flow path in the air discharge device according to the first embodiment.

As the air velocity distribution of the working air is equalized, a velocity boundary layer of the working air is away from a central line CLh of the main flow path 510 in the height direction DRh. Therefore, as shown in FIGS. 8 and 9, when discharged, the working air is restricted from being distributed in the minor direction of the opening of the main hole 512 (i.e., the height direction DRh).

Figure 10:
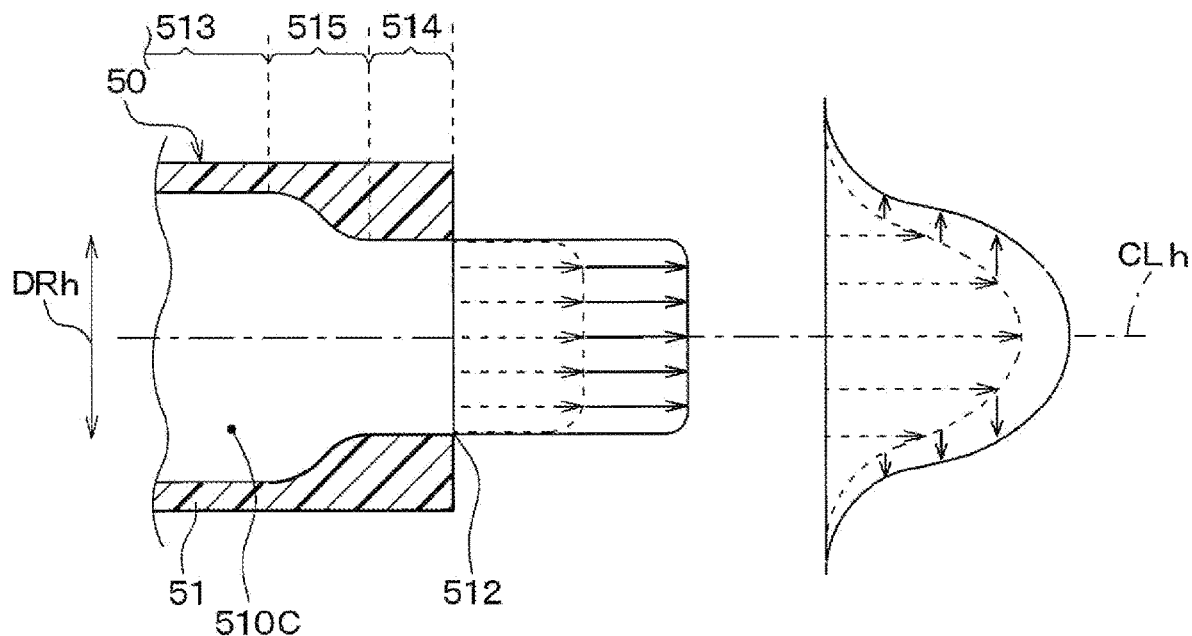
FIG. 10 is an explanatory view for explaining an air velocity distribution of the working air discharged from the center flow path in the air discharge device according to the first embodiment.

In particular, in the air discharge device 50 of the present embodiment, the air flow is discharged through the center flow path 510C at a velocity higher than that of the air flow discharged through the side flow path 510A, 510B. Therefore, as shown by a solid line in FIG. 10, the air velocity distribution of the working air in the center flow path 510C has a convex shape and is extended in the height direction DRh more than that in the air discharge device 50 in which the main flow path 510 is not divided by the partitions 52, 53. If the air velocity distribution of the working air is extended in the height direction DRh, the velocity boundary layer of the working air tends to be away from the central line CLh of the main flow path 510 in the height direction DRh. Therefore, when discharged, the working air is restricted from being diffused in the height direction DRh. In FIG. 10, a broken line shows an air velocity distribution in an air discharge device 50 in which the main flow path 510 is not divided by the partitions 52, 53.

Figure 11:
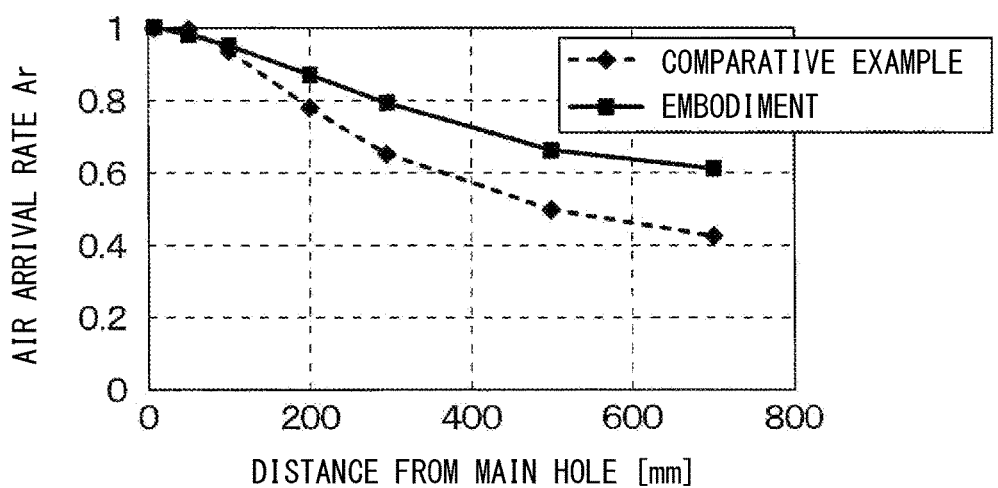
FIG. 11 is a graph showing a relationship between a distance from a main hole and an air arrival rate in the air discharge device according to the first embodiment.
Figure 12:
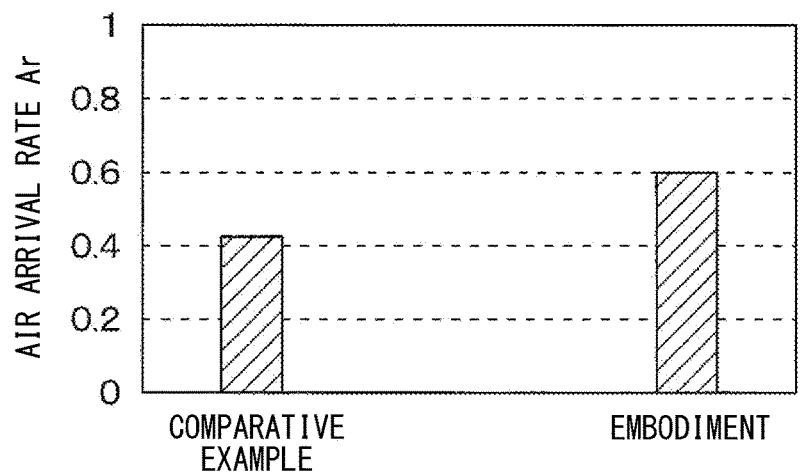
FIG. 12 is a graph showing the air arrival rate at a position downstream from the main hole in the air discharge device by a predetermined distance according to the first embodiment.

Here, FIG. 11 is a graph showing a comparison of relationships between distances from the main hole 512 and air arrival rates Ar, according to the air discharge device CE of the comparative example and the air discharge device 50 of the present embodiment. A vertical axis in FIG. 11 shows the air arrival rate Ar. The air arrival rate Ar is calculated by dividing a maximum air velocity Vmax by an average air velocity Vave (i.e., Ar=Vmax/Vave). The maximum wind velocity Vmax is a maximum air velocity of the working air at a position downstream from the main hole 512 by a predetermined distance. The average air velocity Vave is an average air velocity of the working air at the main hole 512. FIG. 12 is a graph showing a comparison of the air arrival rates Ar downstream from the main hole 512 by 700 mm in the air discharge device CE of the comparative example and in the air discharge device 50 in the present embodiment.

According to FIGS. 11 and 12, in the air discharge device 50 of the present embodiment, the air arrival rate Ar is less likely to be reduced even at the position significantly away from the main hole 512, compared to that in the air discharge device CE of the comparative example. More specifically, the air arrival rate Ar at the position away from the main hole 512 by 700 mm is about 0.42 in the air discharge device CE of the comparative example, while rises to about 0.60 in the air discharge device 50 of the present embodiment. As described above, the air discharge device 50 of the present embodiment enables the air discharged from the air discharge device 50 to reach further than that in the air discharge device CE in the comparative example.

In the air discharge device 50 described above, the throttle portion 515 is included in the duct 51 and reduces the flow path height of the main flow path 510. Because of this, the air velocity distribution of the working air is equalized in the minor direction of the opening of the main hole 512, compared to the contribution in which the duct 51 does not include the throttle portion 515. Therefore, the working air is restricted from being diffused in the minor direction of the opening of the main hole 512.

In addition, in the air discharge device 50, the flow path width of the center flow path 510C is gradually reduced from the upstream of the air flow toward the downstream of the air flow by the first partition 52 and the second partition 53. Therefore, the air flow easily passes into the center flow path 510C, and the air flow discharged through the center flow path 510C passes at a velocity higher than that of the air flow discharged through the side flow path 510A, 510B.

Therefore, the air velocity distribution of the working air in the center flow path 510C has a convex shape extended in the height direction DRh, and the velocity boundary layer of the working air is easily away from the center of the working air. Therefore, the working air is restricted from being diffused in the height direction DRh when discharged.

As described above, in the air discharge device 50 of the present embodiment, the working air is restricted from being diffused in the height direction DRh when discharged. Therefore, even when the main hole 512 formed in a flat shape is employed as the air outlet, the reaching distance of the working air can be increased.

Further, in the duct 51, the width expanding portion 516 is connected to the main hole 512 and expands the flow path width as toward the downstream of the air flow. Because of this, in the configuration including the width expanding portion 516, the air flowing along the width expanding portion 516 connected to the main hole 512 of the duct 51 flows out the mail hole 512 to be away from the central line CLw in the major direction of the opening of the main hole 512. Thereby, the stationary fluid at the outside of the duct 51 is easily entangled at the position away from the center of the opening of the main hole 512, and the flow velocity of the air flowing in a center area of the opening of the main hole 512 can be restricted from being reduced. Therefore, the reaching distance of the working air can be increased.

Further, the first partition 52 and the second partition 53 are arranged such that the downstream ends 522, 532 in the air flow direction are located upstream of the air flow from the opening of the main hole 512, respectively. According to this, the air flow discharged from the main hole 512 is not disturbed by the first partition 52 or the second partition 53, and the reduction of the flow velocity of the working air due to the first partition 52 and the second partition 53 can be sufficiently suppressed. In addition, an opening area of the main hole 512 is not reduced by the first partition 52 or the second partition 53.

First Modification

In the above embodiment, an example in which the first partition 52 and the second partition 53 are formed by flat plates respectively has been described, however, the present disclosure is not limited to this. As the first partition 52 and the second partition 53 are arranged so as to intersect the flow direction of the air flow in the main flow path 510, the air flow may be away from wall surfaces of the first partition 52 and the second partition 53. Because of this, the disturbance caused around the main hole 512 may be increased.

Figure 13:
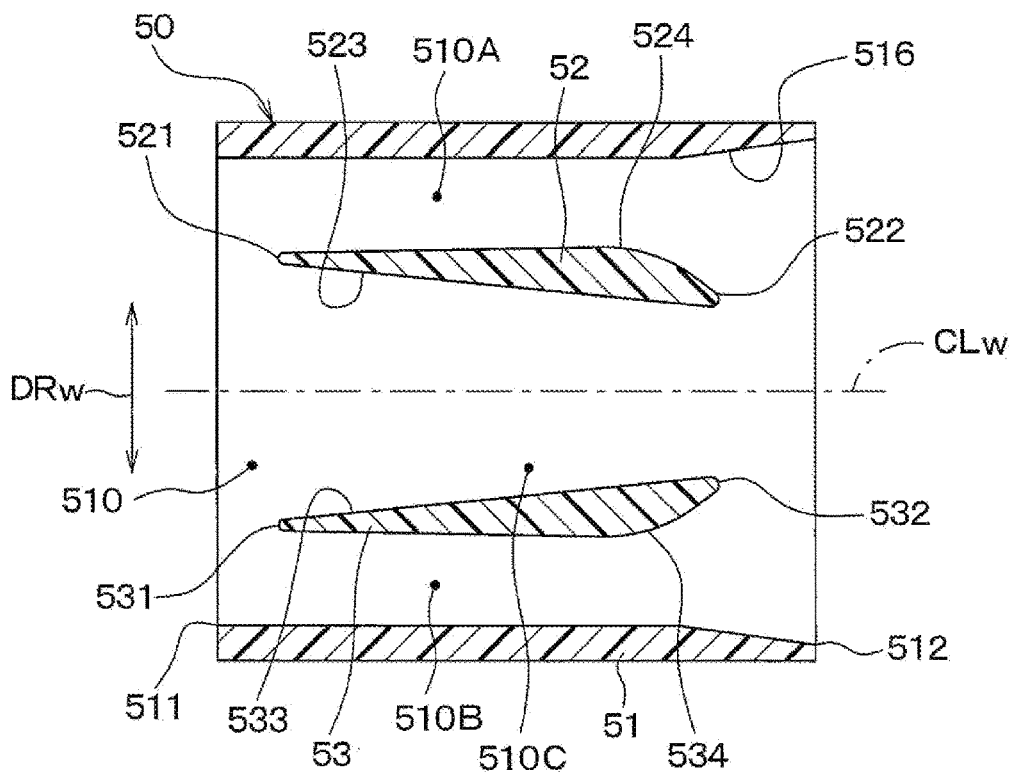
FIG. 13 is a cross-sectional view of an air discharge device according to a first modification of the first embodiment.

Therefore, each of the first partition 52 and the second partition 53 is preferred to have a streamlined shape in a cross-section when viewed in the flow direction of the air flowing in the main flow path 510. In particular, it is desirable that each of the first partition 52 and the second partition 53 has an airfoil profile which has excellent aerodynamic characteristics, as shown in FIG. 13. That is, each of the first partition 52 and the second partition 53 is preferred to be configured such that the upstream end 521, 531 at the upstream of the air flow has a sharp curved surface and the downstream end 522, 532 at the downstream of the air flow has a curved surface rounded more than the upstream end 521, 531.

Specifically, the first partition 52 and the second partition 53 are configured such that inside wall surfaces 523, 533 facing each other are formed in straight shapes, respectively. The inside wall surface 523 of the first partition 52 and the inside wall surface 533 of the second partition 53 extend and are inclined so as to approach each other as toward the downstream of the air flow in order to form the center flow path 510C. In addition, an outside wall surface 524 of the first partition 52 and an outside wall surface 534 of the second partition 53 are formed such that the surface parts close to the upstream ends 521, 531 extend linearly while surface parts close to the downstream ends 522, 532 are curved to gradually approach the inside wall surfaces 523, 533, respectively.

Figure 14:
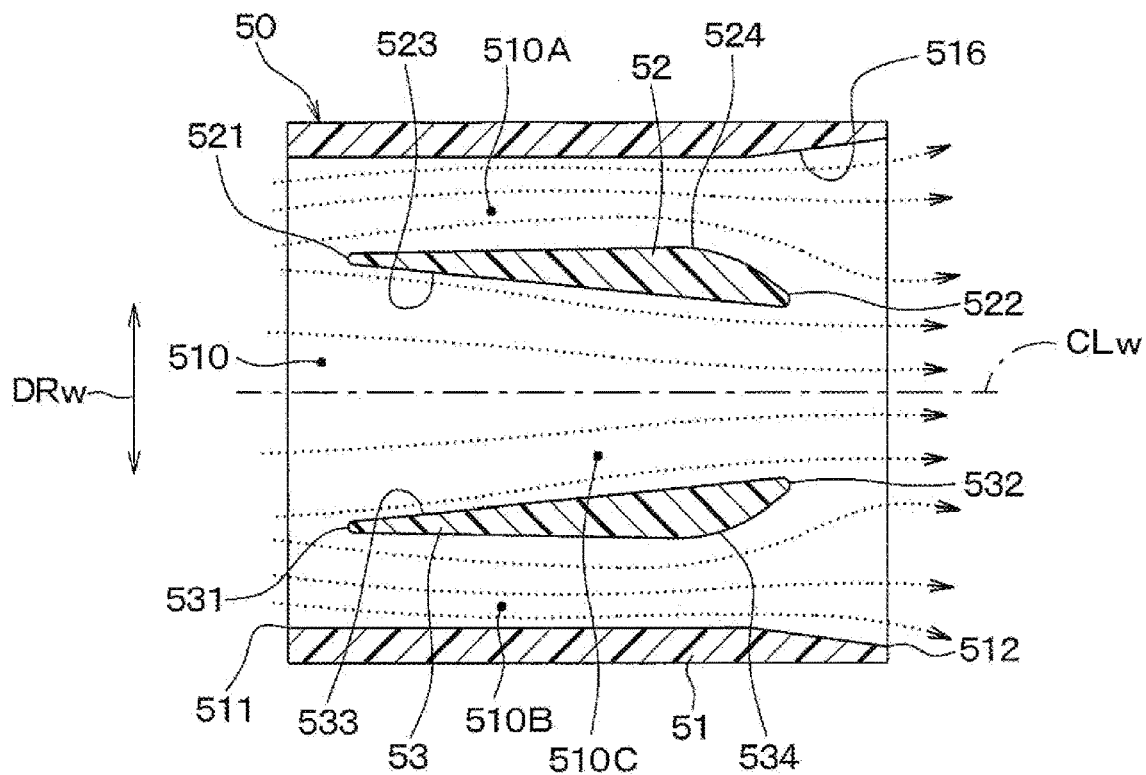
FIG. 14 is an explanatory view for explaining a flow of the working air in a direction along the width flow path in the air discharge device according to the first modification of the first embodiment.

Because of this, as shown in FIG. 14, the air flow is restricted from being away from the surfaces of the first partition 52 and the second partition 53. Therefore, the air flow is protected from disturbance caused by adding the first partition 52 and the second partition 53 around the main hole 512. The above is effective to increase the reaching distance of the working air.

Second Modification

Figure 15:
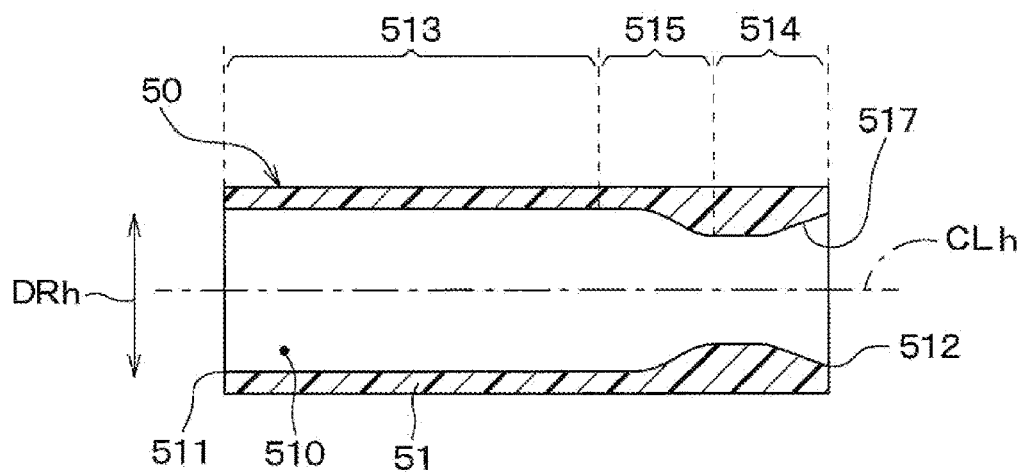
FIG. 15 is a cross-sectional view of an air discharge device according to a second modification of the first embodiment.

In the above embodiment, an example in which the width expanding portion 516 is connected to the main hole 512 in the duct 51 has been described, however, the present disclosure is not limited to this. For example, as shown in FIG. 15, the duct 51 may include a height expanding portion 517 so as to expand the flow path height toward the downstream of the air flow, instead of the width expanding portion 516. The height expanding portion 517 is provided at a portion connected to the main hole 512 and arranged downstream of the air flow from the throttle portion 515 so as not to overlap with the throttle portion 515.

As described above, in the configuration including the height expanding portion 517 in the duct 51, the air flowing along the height expanding portion 517 connected to the main hole 512 of the duct 51 flows out of the main hole 512 to be away from the central line CLh in the minor direction of the opening of the main hole 512. Thereby, the stationary fluid at the outside of the duct 51 is easily entrained at the position away from the center of the opening of the main hole 512, and the flow velocity of the air flowing in a center area of the opening of the main hole 512 can be restricted from being reduced. Therefore, the reaching distance of the working air can be increased.

In this modification, an example in which the duct 51 includes the height expanding portion 517 instead of the width expanding portion 516 has been described, however, the present disclosure is not limited to this. The duct 51 may include both the width expanding portion 516 and the height expanding portion 517.

Second Embodiment

Next, a second embodiment will be described with reference to FIGS. 16 to 21. In the present embodiment, portions different from those of the first embodiment will be mainly described.

Figure 16:
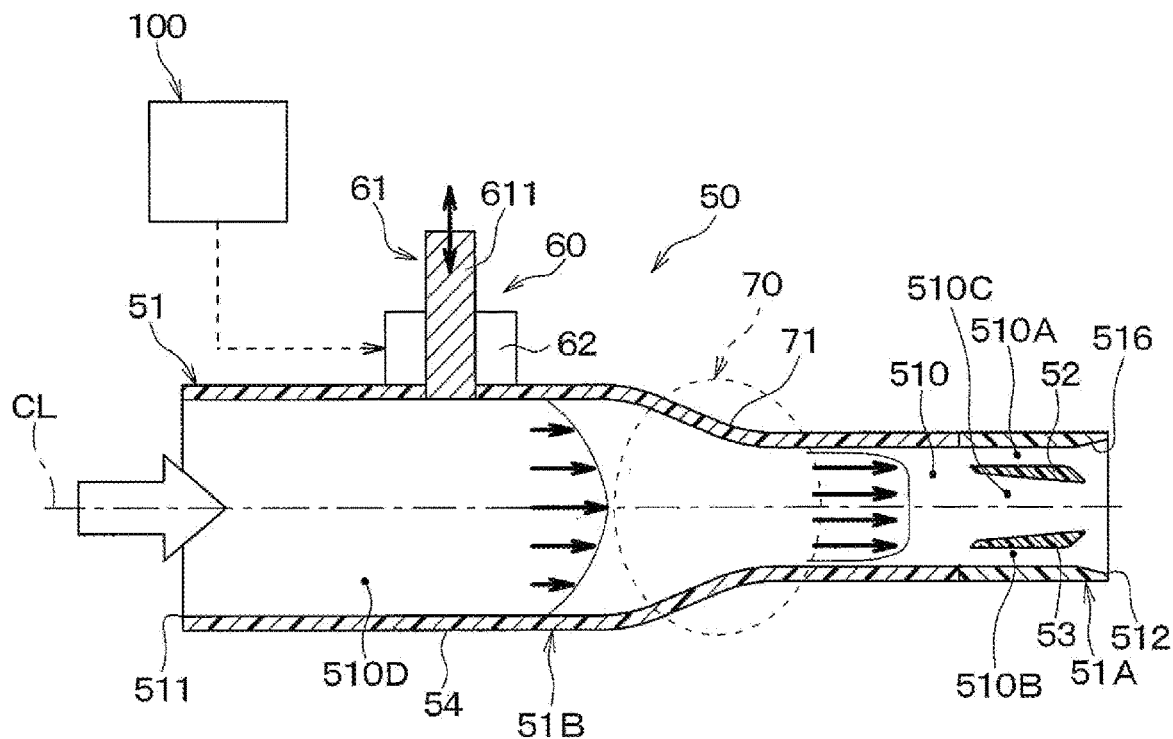
FIG. 16 is a schematic cross-sectional view of an air discharge device when a flow path area of an upstream main flow path is enlarged, according to a second embodiment.
Figure 17:
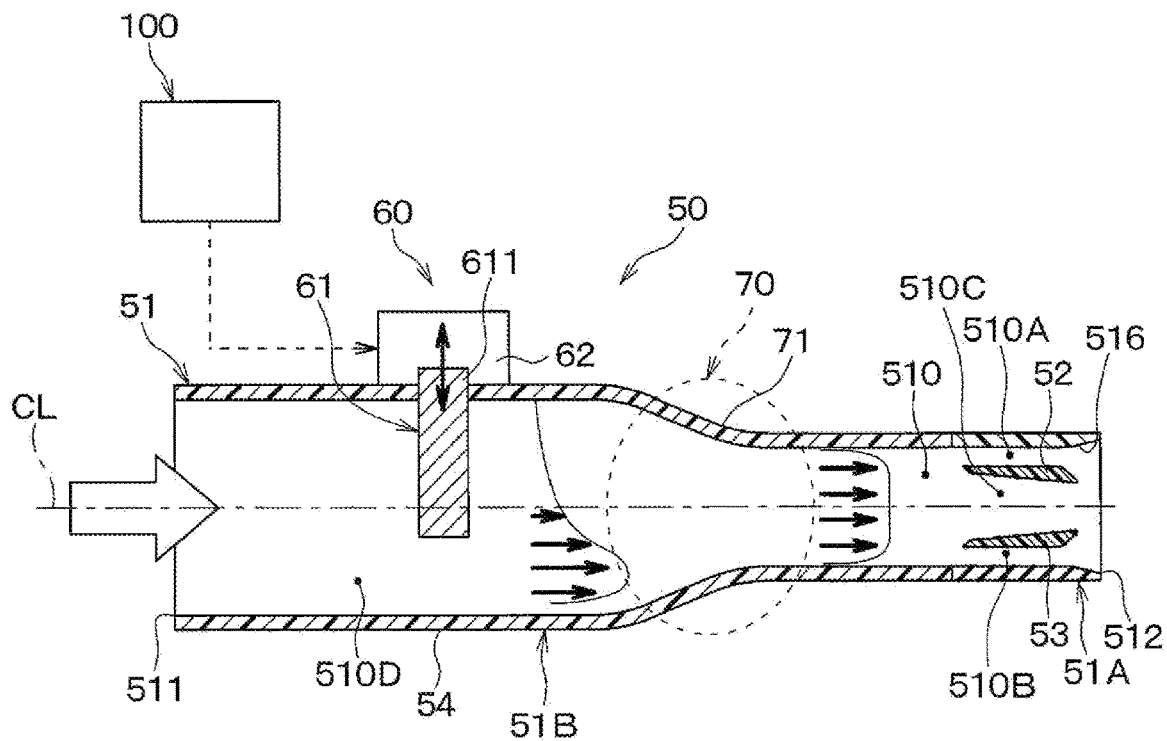
FIG. 17 is a schematic cross-sectional view of the air discharge device when the flow path area of the upstream main flow path is reduced, according to the second embodiment.

As shown in FIGS. 16 and 17, the duct 51 includes a downstream duct 51A and an upstream duct 51B. The first partition 52 and the second partition 53 are arranged in the downstream duct 51A. The upstream duct 51B is arranged upstream from the first partition 52 and the second partition 53.

The first partition 52 and the second partition 53 are arranged in the downstream duct 51A. In the downstream duct 51A, the pair of side flow path 510A, 510B and the center flow path 510C are formed by the first partition 52 and the second partition 53. In addition, in the downstream duct 51A, the main hole 512 is opened downstream from the first partition 52 and the second partition 53. The downstream duct 51A is structured similarly to the duct 51 in the first embodiment.

An upstream main flow path 510D is formed in the upstream duct 51B to guide the air flow to the side flow paths 510A, 510B and the center flow path 510C. The upstream main flow path 510D is arranged upstream from the first partition 52 and the second partition 53 in the main flow path 510. In addition, the introduction hole 511 is opened at an upstream position in the upstream duct 51B.

A flow path variable machine 60 is disposed at the upstream duct 51B and is configured to change a flow path area of the upstream main flow path 510D. In the present embodiment, the flow path variable machine 60 is configured as a pulsatile flow generator so as to discharge the air flow as pulsatile flow from the main hole 512.

The upstream duct 51B is provided with a flow path variable portion 54 at which the flow path area can be changed by the flow path variable machine 60. The flow path variable portion 54 is arranged closer to the introduction hole 511 than the main hole 512.

The flow path variable machine 60 includes a sliding door 61, a drive unit 62, and a door controller 100. The sliding door 61 is configured to regulate the flow path area of the upstream main flow path 510D, and the drive unit 62 is configured to drive the sliding door 61. In the flow path variable machine 60, the drive unit 62 is arranged outside the duct 51.

The sliding door 61 includes a single door portion 611. The door portion 611 has a plate shape and is movable in a direction such that a plate surface of the door portion 611 intersects the central line CL of the main flow path 510.

The sliding door 61 can be set at a first position or a second position. At the first position, most of the door portion 611 is located outside the upstream main flow path 510D. At the second position, most of the door portion 611 is located inside the upstream main flow path 510D.

When the sliding door 61 is set at the first position, the flow path area of the upstream main flow path 510D is largest. On the other hand, when the sliding door 61 is set at the second position, the flow path area of the upstream main flow path 510D is reduced by the door portion 611 to close a part of the upstream main flow path 510D. Here, the first position is a non-restrictive position in which the flow path area of the upstream main flow path 510D is not limited by the sliding door 61. The second position is a restrictive position in which the flow path area of the upstream main flow path 510D is limited by the sliding door 61.

The drive unit 62 is configured to change the position of the sliding door 61. The drive unit 62 changes the position of the sliding door 61 so as to change the flow path area of the upstream main flow path 510D periodically. More specifically, the drive unit 62 changes the position of the sliding door 61 so as to alternately repeat a state in which the flow path area of the upstream main flow path 510D is larger than the opening area of the main hole 512 and a state in which the flow path area of the upstream main flow path 510D is smaller than the opening area of the main hole 512.

The drive unit 62 includes an electric actuator such as a stepping motor and a linear motion converter. The linear motion converter converts a rotational output of the electric actuator into a linear motion of the sliding door 61. The linear motion converter includes, for example, a rack and pinion. The drive unit 62 is controlled in accordance with a control signal output from the door controller 100.

The door controller 100 includes a computer, including a processor and a memory, and a peripheral circuit. The door controller 100 performs various calculations and processes based on programs stored in a memory and controls the drive unit 62 connected to an output side of the door controller 100. The memory of the door controller 100 includes a non-transitory tangible storage medium.

The door controller 100 is separated from an unillustrated air conditioner ECU which controls devices of the indoor air conditioner unit 1. The door controller 100 may be included in the air conditioner ECU.

Figure 18:
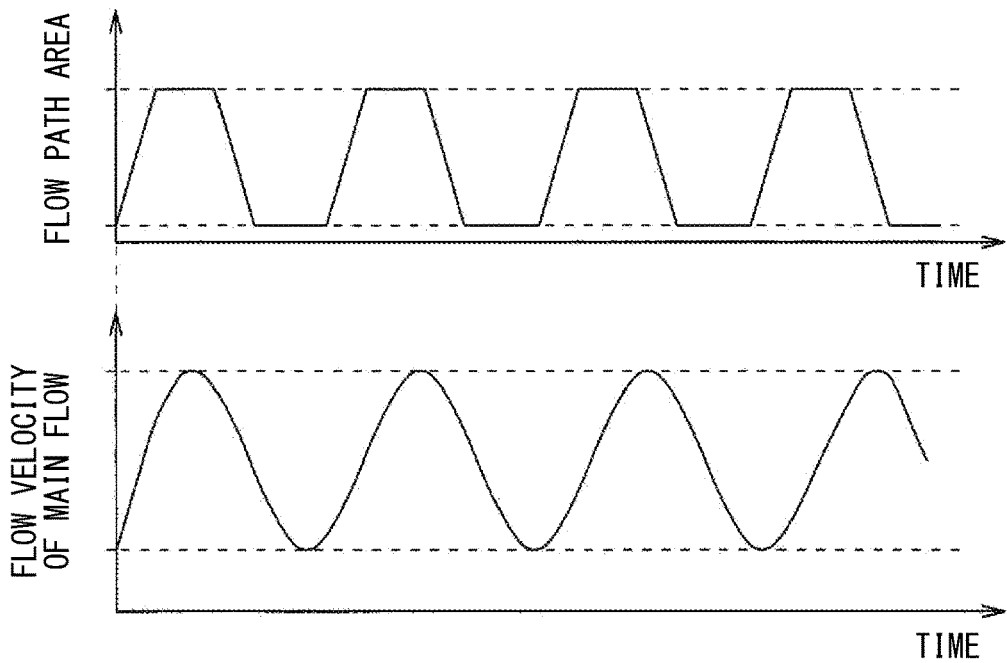
FIG. 18 is a graph showing a relationship between the flow path area of the upstream main flow path and flow velocity of a main flow of the air discharged from the main hole.

As shown by an upper graph in FIG. 18, the door controller 100 controls the drive unit 62 such that the flow path area of the upstream main flow path 510D is changed periodically. That is, the door controller 100 controls the drive unit 62 such that the position of the sliding door 61 is switched periodically between the non-restrictive position and the restrictive position. The door controller 100 controls the drive unit 62 such that a switching period to switch the position of the sliding door 61 is set around 0.1 to 2 seconds.

As a result, in the air flow discharged from the main hole 512, the flow velocity (for example, average flow velocity) of a main flow is changed periodically as shown by a lower graph in FIG. 18. Here, the main flow is a flow toward the opening direction orthogonal to an aperture of the main hole 512.

As shown in FIGS. 16 and 17, in the upstream duct 51B, a rectifying structure is provided downstream from the sliding door 61 of the flow path variable machine and is configured to equalize a velocity distribution of the air flow. The rectifying structure 70 is arranged downstream from the flow path variable portion 54 of the upstream duct 51B.

The rectifying structure 70 of the present embodiment is configured by a reducing portion 71 arranged at the upstream duct 51B. The reducing portion 71 is arranged downstream from the flow path variable portion 54 and is a portion at which the flow path area of the upstream main flow path 510D is gradually reduced toward the downstream. A flow path area of the reducing portion 71 at the downstream is substantially equal to the opening area of the main hole 512, and a flow path area of the reducing portion 71 at the upstream is larger than the opening area of the main hole 512. More specifically, the reducing portion 71 has a cross-sectional area continuously reduced as closer to the first partition 52 and the second partition 53. The reducing portion 71 is arranged such that a ratio of a maximum flow path area to a minimum flow path area of the reducing portion 71 is, for example, 7:2.

In the upstream duct 51B configured as described above, because of the reducing portion 71 arranged downstream from the flow path variable portion 54, the air flow is contracted by the reducing portion 71 after passing through the flow path variable portion 54, and is rectified by the contraction flow.

Next, operation of the air discharge device 50 will be described. When the blower 8 of the indoor air conditioning unit 1 starts operating, the air in which the temperature had been conditioned is introduced from the indoor air conditioning unit 1 into the air discharge device 50. The air introduced into the air discharge device 50 is discharged from the main hole 512 to the passenger compartment through the duct 51.

Figure 19:
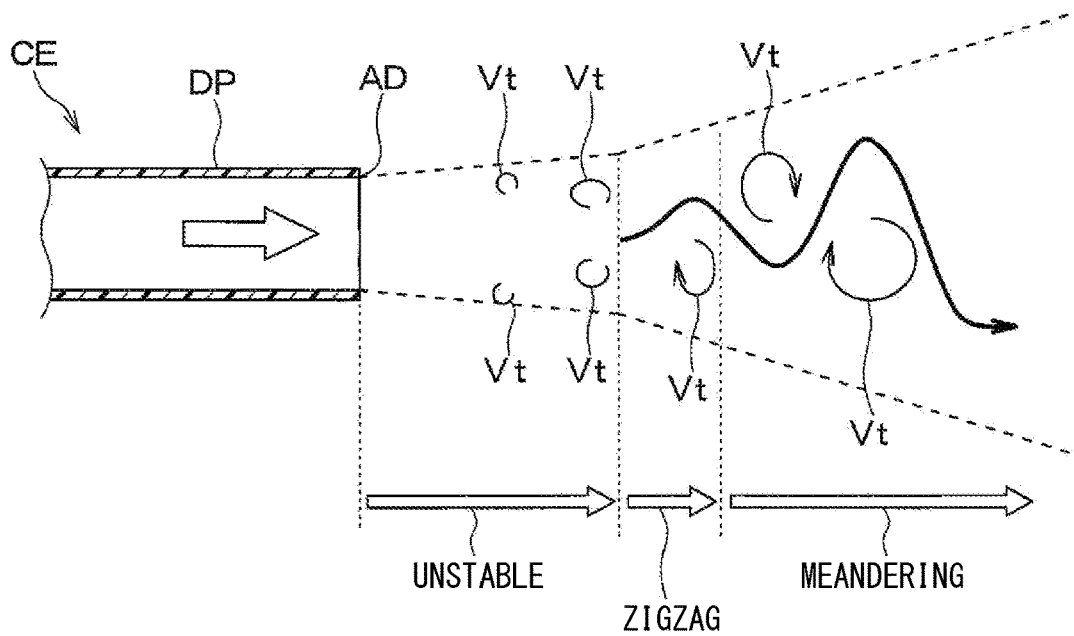
FIG. 19 is an explanatory view showing an air flow discharged from a main hole of an air discharge device according to a comparative example in the second embodiment.

FIG. 19 is a diagram for explaining a state of the air discharged from a discharge outlet AD in an air discharge device CE of a comparative example, comparative with the air discharge device 50 of the present embodiment. In the air discharge device CE of the comparative example, a duct DP has a tubular shape and includes an air flow path in which a cross-sectional shape is constant, and the air flow is discharged from the discharge outlet AD as steady flow. The steady flow is a flow almost without a change in the flow velocity.

As shown in FIG. 19, when the air is blown from the air discharge device CE of the comparative example, friction is caused between the air flow and stopped air (that is stationary fluid). Because of this, a number of transverse vortexes Vt are generated around the main flow which is a core of the air flow. The transverse vortex Vt is a vortex in which an axis of the vortex is along an axial direction perpendicular to the main flow of the air flow.

More specifically, at the downstream from the discharge outlet AD, the transverse vortexes Vt rotating in directions opposite to each other are alternately generated and lined forming a zigzag. When the above vortexes are generated, a flow meandering (that is meandering flow) is formed downstream from the discharge outlet AD due to interference between the main flow and the vortex. By forming the meandering flow at the downstream from the discharge outlet AD, the diffusion of the air flow is promoted. Therefore, a reaching distance of the air flow discharged from the discharge outlet AD is shortened.

On the other hand, in the air discharge device 50 of the present embodiment, the flow path variable machine 60 changes periodically the flow path area of the upstream main flow path 510D so as to discharge the generated pulsatile flow from the main hole 512.

In the air discharge device 50, when the flow path area of the upstream main flow path 510D is larger than that of the main hole 512 by the flow path variable machine 60, the air flow having passed through the flow path variable portion 54 is rectified in the reducing portion 71, as shown in FIG. 16. The air flow rectified at the reducing portion 71 is discharged to the passenger compartment from the main hole 512 through the downstream duct 51A.

The upstream main flow path 510D includes the reducing portion 71. Because of this, the contraction flow is generated before the air flow reaches the pair of side flow paths 510A, 510B and the center flow path 510C from the reducing portion 71. Therefore, in the upstream main flow path 510D, a flow velocity difference between a vicinity of the central line CL and a vicinity of an inner wall surface defining the upstream main flow path 510D becomes small. As a result, the air flow, having a velocity distribution of a top-hat shape, flows into the pair of side flow paths 510A, 510B and the center flow path 510C. The reason why the flow velocity of the air flow is increased in the vicinity of the inner wall surface defining the upstream main flow path 510D is that a centrifugal force acts on the air flow along the inner wall surface defining the upstream main flow path 510D, due to action of a curvature of the inner wall surface defining the upstream main flow path 510D. Here, the contraction flow is a phenomenon in which a difference between a flow velocity around a wall surface of the flow path and a flow velocity of the main flow reduces because of a reduced cross-section of the flow path.

From the above state of FIG. 16, when the flow path area of the upstream main flow path 510D is reduced by the flow path variable machine 60 in the air discharge device 50, the flow path area is reduced, and the sliding door 61 acts as a ventilation resistance, as shown in FIG. 17. Therefore, the flow velocity of the air flow passing in the flow path variable portion 54 is reduced.

In addition, as the flow path area of the upstream main flow path 510D is reduced by the flow path variable machine 60, the velocity distribution of the air flow is biased at the downstream from the flow path variable portion 54. More specifically, at the downstream of the flow path variable portion 54, the flow velocity of the air flow is reduced downstream from a plate of the sliding door 61, and the flow velocity of the air flow is increased around an end of the sliding door 61.

On the other hand, the reducing portion 71 is arranged downstream from the flow path variable portion 54. Because of this, the contraction flow is generated before the air flow reaches the pair of side flow paths 510A, 510B and the center flow path 510C from the reducing portion 71. Therefore, in the upstream main flow path 510D, a flow velocity difference between a vicinity of the central line CL and a vicinity of an inner wall surface defining the upstream main flow path 510D becomes small. As a result, the air flow, having a velocity distribution of a top-hat shape, flows into the pair of side flow paths 510A, 510B and the center flow path 510C.

Figure 20:
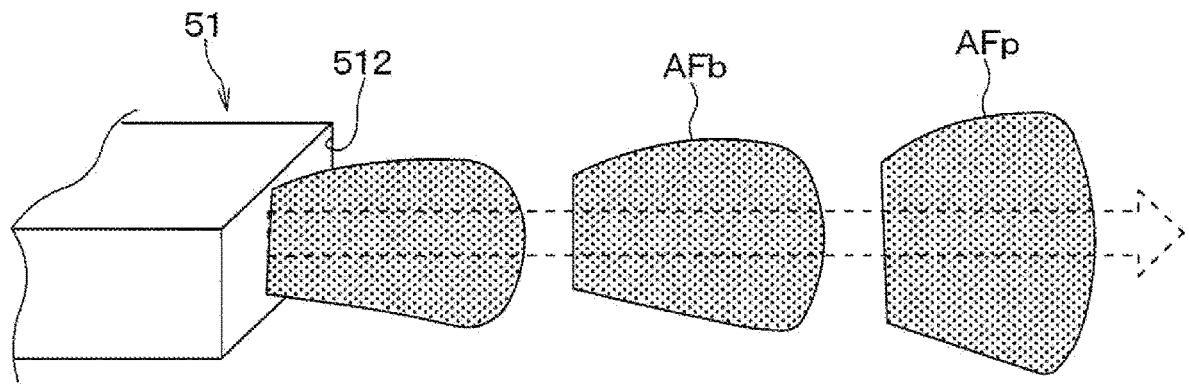
FIG. 20 is an explanatory view showing an air flow discharged from a main hole of the air discharge device according to the second embodiment.

In the air discharge device 50, the air flow becomes the pulsatile flow and is discharged from the main hole 512. At this point, as shown in FIG. 20, a following air flow AFb generated after a preceding air flow AFp is supplied intermittently to a downstream from the main hole 512.

Figure 21:
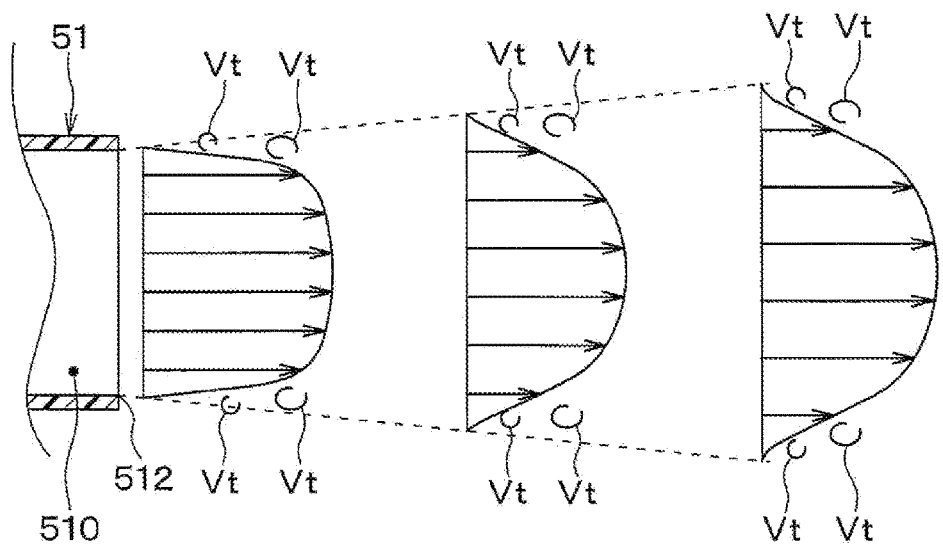
FIG. 21 is an explanatory view showing a velocity distribution of the air flow discharged from the main hole of the air discharge device according to the second embodiment.

More specifically, as shown in FIG. 21, when the air flow blown from the main hole 512 becomes the pulsatile flow, a position at which the transverse vortex Vt is generated, a size of the transverse vortex Vt, or the like at the downstream from the main hole 512 are changed. In addition, continuity of the transverse vortexes Vt generated downstream from the main hole 512 is easily interrupted. Because of this, development of the transverse vortexes Vt is restricted, and vortex street in which the vortexes are arranged in a staggered pattern is difficult to be generated downstream from the main hole 512. Therefore, the air flow downstream from the main hole 512 is restricted from meandering.

The other configurations are the same as those of the first embodiment. The air discharge device 50 of the present embodiment has the same configuration as that of the first embodiment, and the action and effect produced by the configuration common to the first embodiment can be obtained in the same manner as in the first embodiment.

In addition, in the air discharge device 50 of the present embodiment, the flow path variable machine 60 is arranged at the upstream main flow path 510D. Because of this, when the flow path area of the upstream main flow path 510D is changed by the flow path variable machine 60, the air is discharged from the main hole 512 as the pulsatile flow. When the air flow discharged from the main hole 512 is the pulsatile flow, a generated position of the transverse vortex Vt, a generated size of the transverse vortex Vt, or the like at the downstream from the main hole 512 are changed. Therefore, the vortex street in which the vortexes in the staggered pattern are arranged is difficult to be formed downstream from the main hole 512, and the air flow downstream from the main hole 512 is restricted from meandering. As a result, in the air discharge device in the present embodiment, the reaching distance of the air flow discharged from the main hole 512 can be increased.

Further, the air discharge device 50 is provided with the rectifying structure 70 at the downstream from the flow path variable portion 54 in the upstream main flow path 510D to equalize the velocity distribution of the air flow. Because of this, a bias in the velocity distribution caused in the upstream main flow path 510D by the flow path variable machine 60 is equalized by the rectifying structure 70. Therefore, the air flowing in the pair of side flow paths 510A, 510B and the center flow path 510C is stabilized. As a result, the air easily flows into the center flow path 510C, and the air is discharged through the center flow path 510C at a velocity higher than that of the air discharged through the side flow path 510A, 510B.

More specifically, the rectifying structure 70 includes the reducing portion 71 arranged at the upstream duct 51B. Due to this, the air flow passing through the reducing portion 71 is contracted, and the flow velocity difference of the main flow between a vicinity of a center and a vicinity of an inner wall surface defining the upstream duct 51B becomes small. Because of this, a thickness of the velocity boundary layer formed around the inner wall surface defining the upstream duct 51B can be reduced. As a result, the air flow which has a stable flow velocity distribution flows into the pair of side flow paths 510A, 510B and the center flow path 510C.

A configuration to generate the pulsatile flow in the air discharge device 50 of the present embodiment has excellent responsiveness compared to a case when the pulsatile flow is generated by operating the blower 8 intermittently. That is, the air discharge device 50 in the present embodiment is configured to generate the pulsatile flow more suitably than a device which generates the pulsatile flow by operating the blower 8 intermittently.

Modification of Second Embodiment

In the above second embodiment, an example in which the flow path variable machine 60 including the sliding door 61 and the rectifying structure 70 including the reducing portion 71 are combined in the air discharge device 50 has been described, however, the air discharge device 50 is not limited to this. In the air discharge device 50, for example, one of the flow path variable machine 60 or the rectifying structure 70 may be configured as described in other than the second embodiment.

Third Embodiment

Next, a third embodiment will be described with reference to FIGS. 22 and 23. In this embodiment, portions different from those of the second embodiment will be mainly described.

Figure 22:
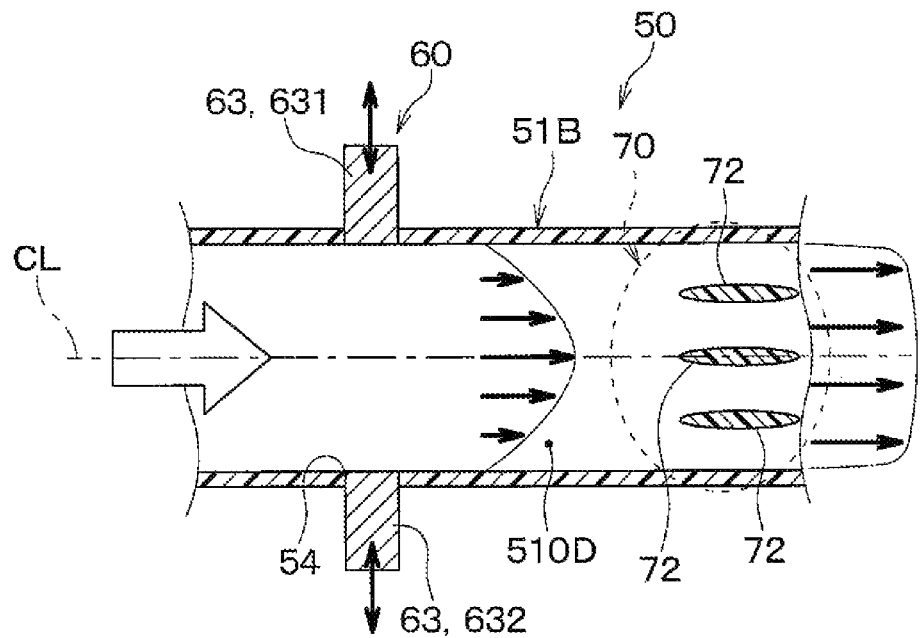
FIG. 22 is a schematic cross-sectional view of an air discharge device when a flow path area of an upstream main flow path is enlarged according to a third embodiment.
Figure 23:
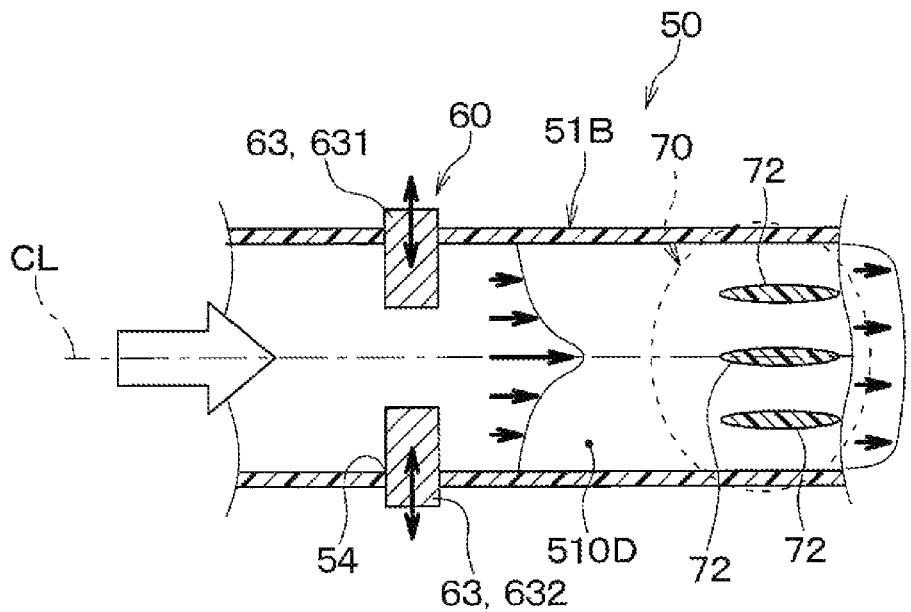
FIG. 23 is a schematic cross-sectional view of the air discharge device when the flow path area of the upstream main flow path is reduced according to the third embodiment.

As shown in FIGS. 22 and 23, a flow path variable machine 60 includes a bi-parting door 63 such as double doors opened by sliding. The bi-parting door 63 includes a pair of doors 631, 632.

The pair of doors 631, 632 are opposed to each other through the upstream main flow path 510D. More specifically, the door 631, 632 has a plate shape and can be disposed in a direction such that a plate surface of the door 631, 632 intersects the central line CL of the upstream main flow path 510.

The bi-parting door 63 is configured to be set at a first position in which the pair of doors 631, 632 are located far from the central line CL of the main flow path 510 or a second position in which the pair of doors 631, 632 approach the central line CL of the main flow path 510.

When the bi-parting door 63 is set at the first position, the flow path area of the upstream main flow path 510D is largest as shown in FIG. 22. When the bi-parting door 63 is set at the second position, the flow path area of the upstream main flow path 510D is reduced because the plate surface of the bi-parting door 63 partially blocks the upstream main flow path 510D as shown in FIG. 23. Here, the first position is a non-restrictive position in which the flow path area of the upstream main flow path 510D is not limited by the bi-parting door 63. The second position is a restrictive position in which the flow path area of the upstream main flow path 510D is limited by the bi-parting door 63.

In addition, in the upstream duct 51B, multiple fins 72 are arranged downstream from the flow path variable portion 54 and line in the upstream main flow path 510D. The multiple fins 72 each have plate shapes and are arranged at the upstream main flow path 510D such that plate surfaces of the multiple fins 72 are parallel with each other.

In the upstream duct 51B configured as above, after the air flowing into the upstream main flow path 510D is rectified by the multiple fins 72, the air is discharged from the main hole 512 through the downstream duct 51A. Because of this, the air flow which has the stable flow velocity distribution flows into the pair of side flow paths 510A, 510B and the center flow path 510C.

The other configurations are the same as those of the second embodiment. The other parts of the air discharge device 50 according to the present embodiment have configurations common to that of the second embodiment. Therefore, the action and effect produced by the configuration of the second embodiment can be obtained in the same manner as in the second embodiment.

In the air discharge device 50 according to this embodiment, the rectifying structure 70 includes the multiple fins 72. Because of this, the air after passing through the flow path variable portion 54 is rectified by the multiple fins 72. Therefore, the air flow which has the stable flow velocity distribution flows into the pair of side flow paths 510A, 510B and the center flow path 510C.

Modification of Third Embodiment

In the third embodiment described above, the flow path variable machine 60 including the bi-parting door 63 and the rectifying structure 70 including the multiple fins 72 are combined in the air discharge device 50, however, the air discharge device is not limited to this. In the air discharge device 50, for example, one of the flow path variable machine 60 or the rectifying structure 70 may be configured as described in other than the third embodiment.

Fourth Embodiment

Next, a fourth embodiment will be described with reference to FIGS. 24 to 26. In this embodiment, portions different from those of the second embodiment will be mainly described.

Figure 24:
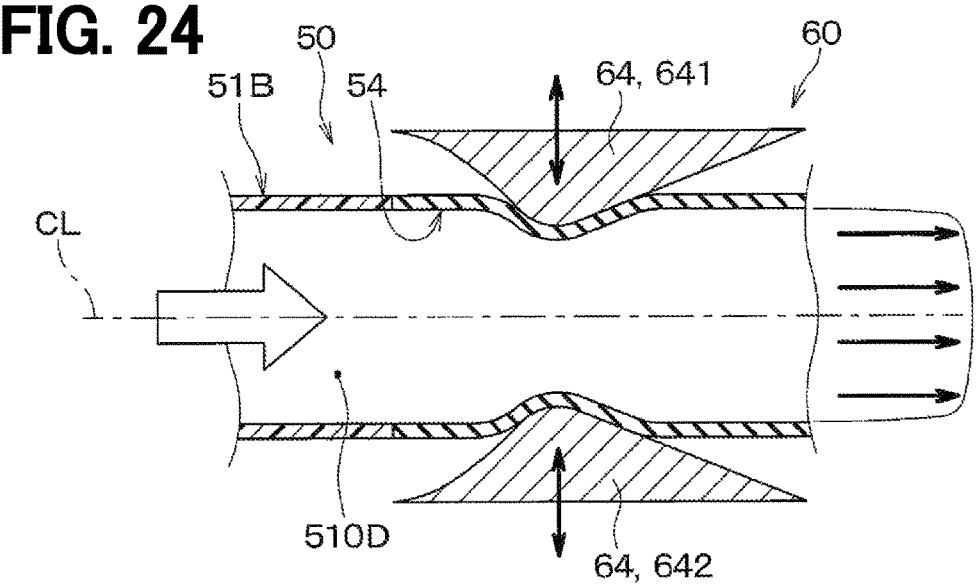
FIG. 24 is a schematic cross-sectional view of an air discharge device when a flow path area of an upstream main flow path is enlarged according to a fourth embodiment.
Figure 25:
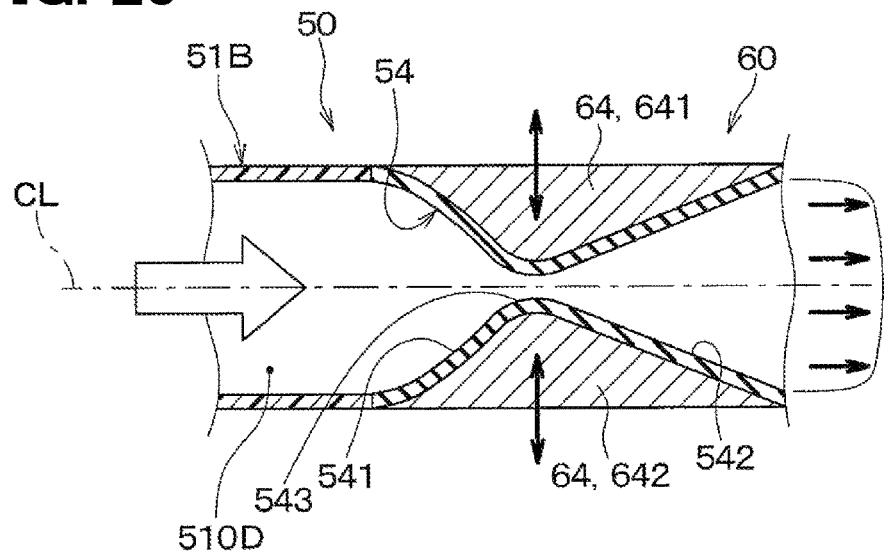
FIG. 25 is a schematic cross-sectional view of the air discharge device when the flow path area of the upstream main flow path is reduced according to the fourth embodiment.
Figure 26:
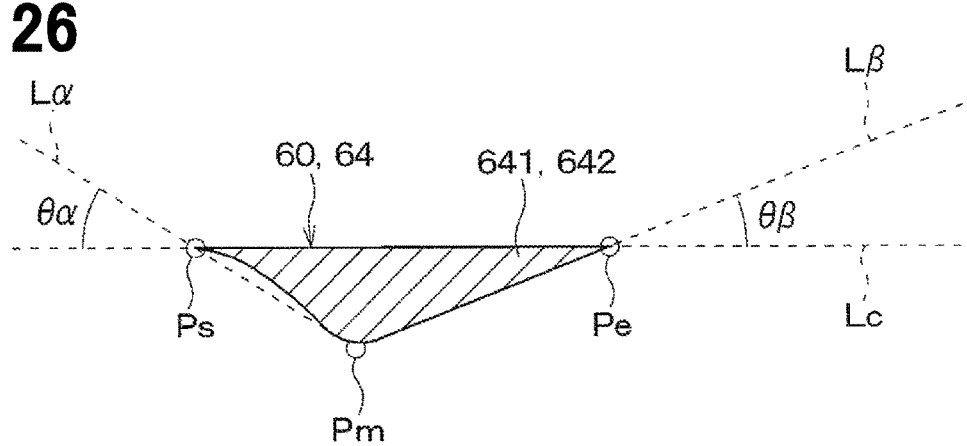
FIG. 26 is an explanatory view for explaining a pressing portion of the air discharge device according to the fourth embodiment.

As shown in FIGS. 24 and 25, in the upstream duct 51B, the flow path variable portion 54 has the flow path area which can be changed by the flow path variable machine 60 and is deformed when force is applied from the outside. The flow path variable portion 54 is made of material which has elasticity (for example, rubber material).

The flow path variable machine 60 is enabled to change the flow path area of the upstream main flow path 510D by deforming the flow path variable portion 54. The flow path variable machine 60 in the present embodiment is configured to deform the flow path variable portion 54 such that at least a part of an inner wall surface of the flow path variable portion 54 approaches the center of the upstream main flow path 510D. More specifically, the flow path variable machine 60 includes a deforming member 64 configured to deform the flow path variable portion 54.

The deforming members 64 have a pair of pressing portions 641, 642, respectively, to exert an external force to the flow path variable portion 54. As shown in FIG. 26, the pressing portion 641, 642 is formed in an approximately triangular shape which includes an obtuse angle. The pair of pressing portions 641, 642 are arranged such that tops Pm which have the obtuse angles are opposed to each other through the flow path variable portion 54.

The pressing portion 641, 642 has an upstream corner Ps located upstream and having an angle θα smaller than or at 20° and a downstream corner Pe located downstream and having an angle θβ smaller than or at 3.5°. Here, the angle θα is an angle between the central line CL of the upstream main flow path 510D and a virtual line Lα connecting the upstream corner Ps to the top Pm. The angle θβ is an angle between the central line CL of the upstream main flow path 510D and a virtual line Lβ connecting the top Pm to the downstream corner Pe.

At the pressing portion 641, 642 of the present embodiment, the angle θα of the upstream corner Ps is larger than the angle θβ of the downstream corner Pe. However, at the pair of pressing portions 641, 642, for example, the angle θα of the upstream corner Ps may have a size similar to that of the angle θβ of the downstream corner Pe.

The deforming member 64 is configured to be set at a first position in which the tops Pm of the pair of pressing portions 641, 642 are located far from the central line CL of the upstream main flow path 510D or a second position in which the tops Pm of the pair of pressing portions 641, 642 approach the central line CL of the upstream main flow path 510D.

When the deforming member 64 is set at the first position, the flow path area of the upstream main flow path 510D is largest, as shown in FIG. 24. When the deforming member 64 is set at the second position, the flow path area of the upstream main flow path 510D is reduced by the tops Pm of the pair of pressing portions 641, 642 approaching the central line CL of the upstream main flow path 510D, as shown in FIG. 25. Here, the first position is a non-restrictive position in which the flow path area of the upstream main flow path 510D is not limited by the deforming member 64. The second position is a restrictive position in which the flow path area of the upstream main flow path 510D is limited by the deforming member 64.

As shown in FIG. 25, when the flow path area of the upstream main flow path 510D is reduced, a reducing slope 541 and an enlarging slope 542 are formed at the flow path variable portion 54. At the reducing slope 541, the flow path area of the upstream main flow path 510D is continuously reduced. At the enlarging slope 542, the flow path area of the upstream main flow path 510D is continuously increased. In addition, a flow path throat 543 is formed between the reducing slope 541 and the enlarging slope 542 in the flow path variable portion 54. The flow path area of the upstream main flow path 510D is smallest at the flow path throat 543 in the flow path variable portion 54. The enlarging slope 542 is formed downstream from the reducing slope 541 and the flow path throat 543 in the upstream duct 51B.

As described above, the flow path variable machine 60 of the present embodiment is enabled to change the flow path area of the upstream main flow path 510D such that the flow path throat 543 is formed between the reducing slope 541 and the enlarging slope 542 to reduce the flow path area of the upstream main flow path 510D.

Next, operation of the air discharge device 50 will be described. When the blower 8 of the indoor air conditioning unit 1 starts operating, the air in which the temperature had been regulated is introduced from the indoor air conditioning unit 1 into the air discharge device 50. The air introduced into the air discharge device 50 is discharged from the main hole 512 to the passenger compartment through the duct 51. In the air discharge device 50, the flow path area of the upstream main flow path 510D is periodically changed, and the air flow becomes the pulsatile flow and is discharged from the main hole 512.

When the flow path area of the upstream main flow path 510D is reduced by the flow path variable machine 60, the reducing slope 541, the flow path throat 543, and the enlarging slope 542 are formed in the upstream duct 51B. In this case, when the flow path area of the upstream main flow path 510D is changed by the flow path variable machine 60, the air flowing from the reducing slope 541 toward the flow path throat 543 becomes the contraction flow. Therefore, the flow velocity difference of the main flow between the vicinity of the center and the vicinity of the inner wall surface defining the upstream duct 51B is small, and the thickness of the velocity boundary layer formed around the inner wall surface defining the upstream duct 51B can be reduced.

In addition, when the flow path area of the upstream main flow path 510D is changed by the flow path variable machine 60, the enlarging slope 542 is formed. Because of this, the velocity boundary layer of the air flow is easily formed so as to be away from the vicinity of the center of the upstream main flow path 510D in accordance with a shape of an inner wall surface of the upstream duct 51B. Therefore, the air flow which has the stable flow velocity distribution can flow into the pair of side flow paths 510A, 510B and the center flow path 510C.

The other configurations are the same as those of the second embodiment. The other parts of the air discharge device 50 according to the present embodiment have configurations common to that of the second embodiment. Therefore, the action and effect produced by the configuration of the second embodiment can be obtained in the same manner as in the second embodiment.

In the air discharge device 50 of the present embodiment, when the flow path area of the upstream main flow path 510D is reduced by the flow path variable machine 60, the air flowing in the upstream main flow path 510D is rectified by the reducing slope 541, the flow path throat 543, and the enlarging slope 542. According to this, without the rectifying structure 70 at the upstream duct 51B, the air flowing in the upstream main flow path 510D can be rectified.

In the air discharge device 50 of the present embodiment, the flow path variable portion 54 is deformed by the flow path variable machine 60 such that at least a part of the inner wall surface of the flow path variable portion 54 approaches the central line CL of the upstream main flow path 510D. According to this, the flow velocity distribution of the air flow is restricted from being biased at the downstream from the flow path variable portion 54. Therefore, the air flow which has the stable flow velocity distribution can flow into the pair of side flow paths 510A, 510B and the center flow path 510C.

Modification of Fourth Embodiment

Figure 27:
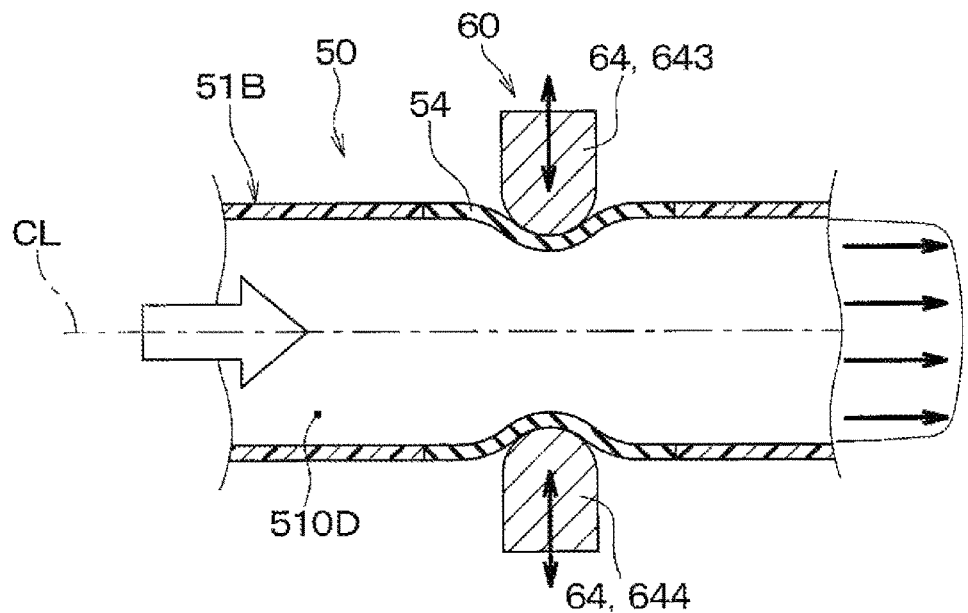
FIG. 27 is a schematic cross-sectional view of an air discharge device when a flow path area of an upstream main flow path is enlarged according to a modification of the fourth embodiment.
Figure 28:
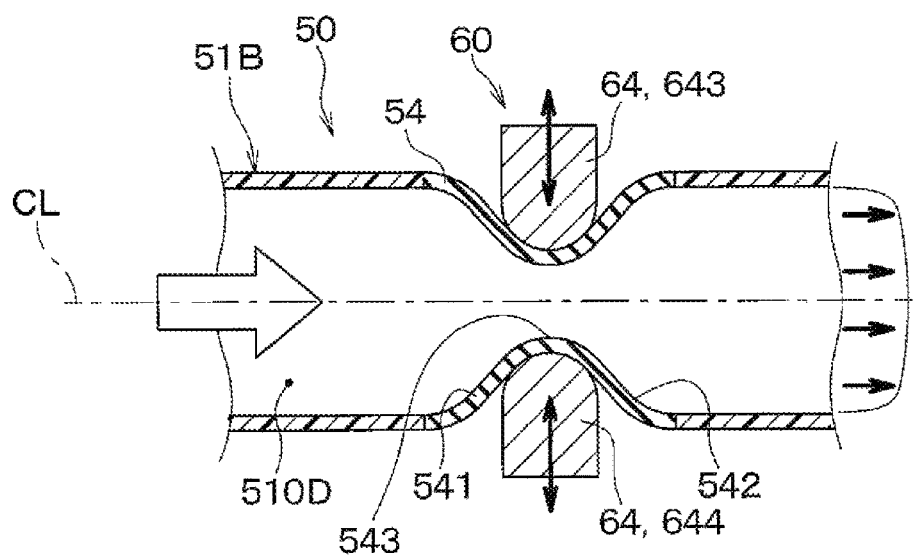
FIG. 28 is a schematic cross-sectional view of the air discharge device when the flow path area of the upstream main flow path is reduced according to the modification of the fourth embodiment.

In the fourth embodiment described above, an example in which the flow path variable portion 54 is pressed by the pair of pressing portions 641, 642 which each have substantially triangular shapes has been described, however, the present disclosure is not limited to this. In the air discharge device 50, for example, the flow path variable portion 54 may be pressed by a pair of pressing portions 643, 644 which each include end surfaces formed in arc shapes, as shown in FIGS. 27 and 28.

Fifth Embodiment

Next, a fifth embodiment will be described with reference to FIGS. 29 to 31. In this embodiment, portions different from those of the second embodiment will be mainly described.

Figure 29:
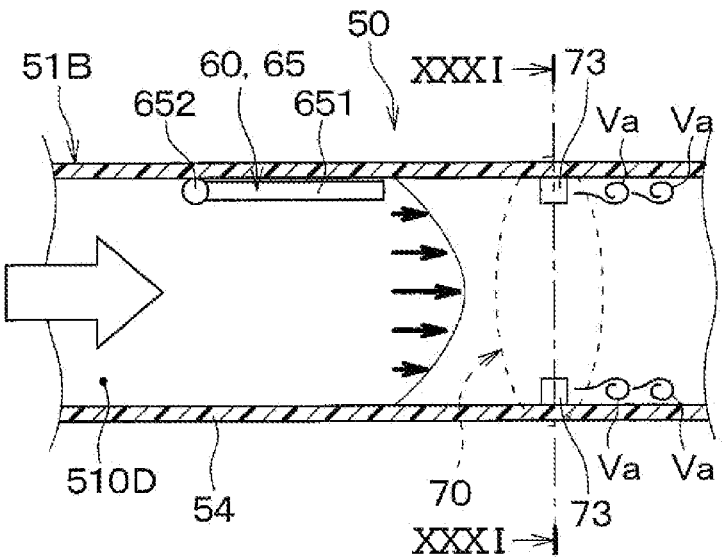
FIG. 29 is a schematic cross-sectional view of an air discharge device when a flow path area of an upstream main flow path is enlarged according to a fifth embodiment.
Figure 30:
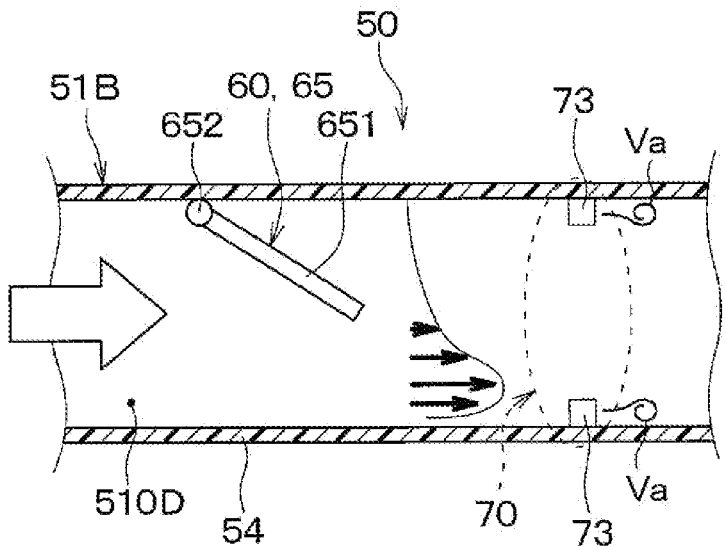
FIG. 30 is a schematic cross-sectional view of the air discharge device when the flow path area of the upstream main flow path is reduced according to the fifth embodiment.

As shown in FIGS. 29 and 30, the flow path variable machine 60 includes a regulating door 65 configured to regulate the flow path area of the upstream main flow path 510D. The regulating door 65 is a rotary door of a cantilever type and includes a door part 651 and a door shaft 652. The door part 651 is formed in a plate shape, and the door shaft 652 is connected to an end of the door part 651. The regulating door 65 is configured to be set at a first position, in which a plate surface of the door part 651 extends in parallel with a direction in which the upstream main flow path 510D extends, or a second position, in which the plate surface of the door part 651 intersects the direction in which the upstream main flow path 510D extends.

When the regulating door 65 is set at the first position, the flow path area of the upstream main flow path 510D is largest as shown in FIG. 29. When the regulating door 65 is set at the second position, the flow path area of the upstream main flow path 510D is reduced because the regulating door 65 blocks a part of the upstream main flow path 510D, as shown in FIG. 30.

In the upstream duct 51B, a vortex generator 73 is arranged downstream from the flow path variable portion 54. The vortex generator 73 is configured to generate an auxiliary vortex Va which has a vortex characteristic with a vortex rotation direction and a vortex axis direction, different from that of the transverse vortex generated downstream from the main hole 512.

Figure 31:
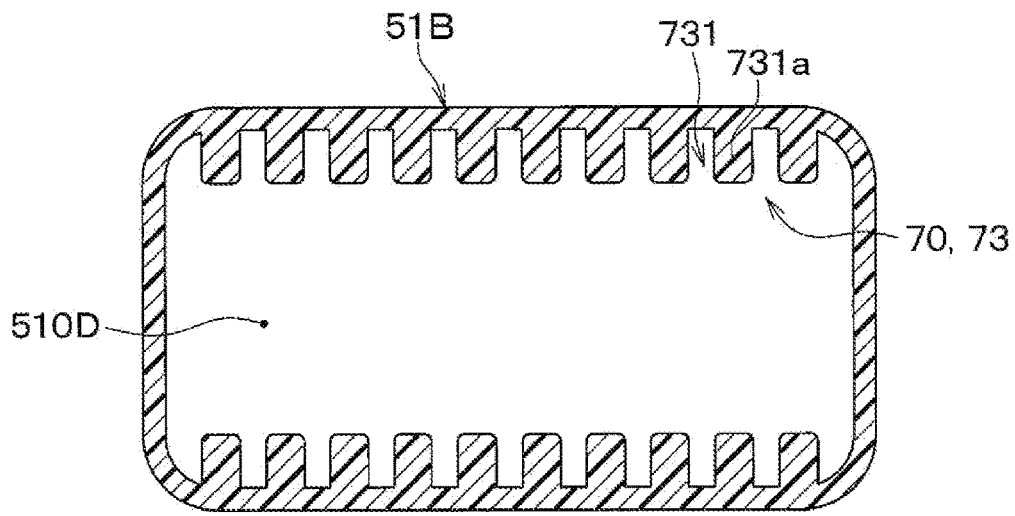
FIG. 31 is a cross-sectional view taken along a line XXXI-XXXI in FIG. 29.

As shown in FIG. 31, the vortex generator 73 includes a serration part 731 arranged in the upstream duct 51B. The serration part 731 is arranged at a part of the inner wall surface of the upstream duct 51B. However, the serration part 731 may be arranged at an entire periphery of the inner wall surface of the upstream duct 51B.

More specifically, the serration part 731 includes multiple protrusions 731a each formed in quadrangular shapes and arranged through predetermined gaps, respectively. The protrusion 731a protrudes from the inside wall surface of the upstream duct 51B toward the central line CL of the upstream main flow path 510D.

Because of the vortex generator 73 arranged in the upstream duct 51B, when the air flow passes around the vertex generator 73, the auxiliary vortex Va which has at least one of the vortex rotation direction or the vortex axis direction different from that of the transverse vortex is generated in the upstream duct 51B configured as described above.

In the above configuration, the air flowing in the upstream duct 51B is rectified by the auxiliary vortex Va, and thickness of the velocity boundary layer formed around the inner wall surface defining the upstream duct 51B can be reduced. In the present embodiment, the rectifying structure 70 is configured by the vortex generator 73. The other configurations are the same as those of the second embodiment.

The other parts of the air discharge device 50 according to the present embodiment may have configurations common to that of the second embodiment. Therefore, the action and effect produced by the configuration of the second embodiment can be obtained in the same manner as in the second embodiment.

In the present embodiment, the vortex generator 73 is arranged as the rectifying structure 70, and the flow velocity distribution of the air flow downstream from the flow path variable portion 54 is restricted from being biased. Therefore, the air flow which has the stable flow velocity distribution can flow into the pair of side flow paths 510A, 510B and the center flow path 510C.

Modification of Fifth Embodiment

In the fifth embodiment described above, an example in which the serration part 731 includes the multiple protrusions 731a formed in the quadrangular shapes has been described, however, the serration part 731 is not limited to this. The serration part 731 may includes, for example, multiple protrusions formed in arc shapes, a recess-protrusion portion in which protrusions and recesses formed in arc shapes are arranged alternately, or multiple protrusions formed in a triangular shape.

In the fifth embodiment described above, the flow path variable machine 60 including the regulating door 65 and the rectifying structure 70 including the vortex generator 73 are combined in the air discharge device 50, however, the air discharge device 50 is not limited to this. In the air discharge device 50, for example, one of the flow path variable machine 60 and the rectifying structure 70 may be configured other than of the fifth embodiment. This also applies to a sixth embodiment.

Sixth Embodiment

Next, the sixth embodiment will be described with reference to FIGS. 32 and 33. In this embodiment, portions different from those of the fifth embodiment will be mainly described.

Figure 32:
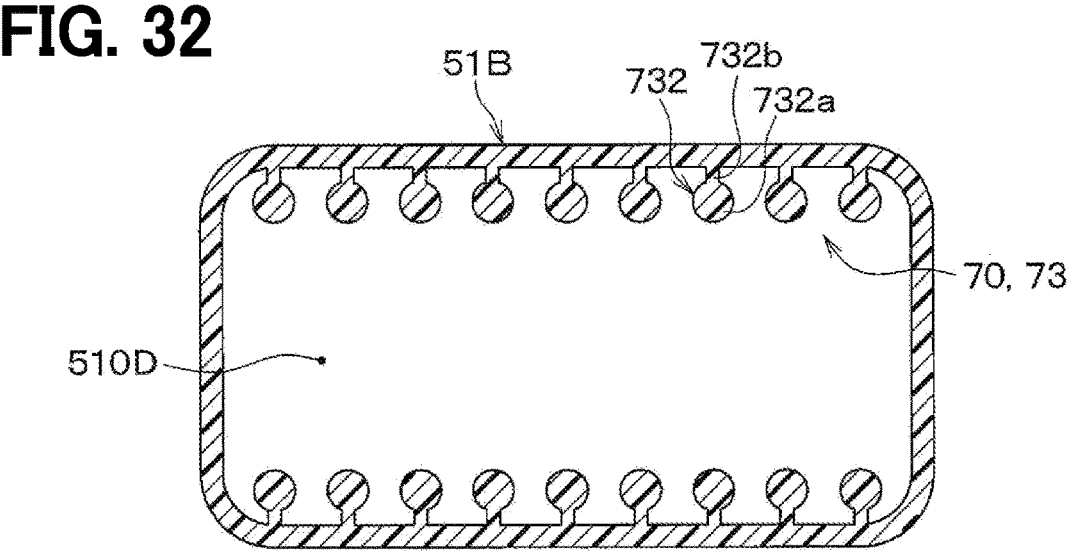
FIG. 32 is a schematic cross-sectional view of an air discharge device according to a sixth embodiment.

As shown in FIG. 32, the vortex generator 73 includes multiple block bodies 732 arranged in the upstream duct 51B through predetermined spaces. The multiple block bodies 732 are arranged at a part of the inner wall surface of the upstream duct 51B. However, the multiple block bodies 732 may be arranged at an entire periphery of the inner wall of the upstream duct 51B.

The block body 732 protrudes from the inner wall of the upstream duct 51B toward the upstream main flow path 510D. More specifically, the block body 732 protrudes in a direction intersecting the opening direction of the main hole 512.

Figure 33:
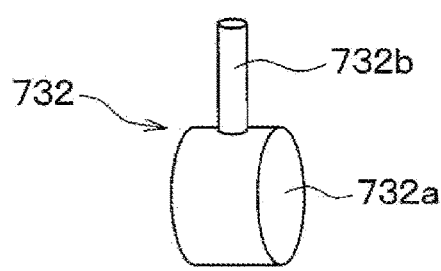
FIG. 33 is a schematic perspective view showing a vortex generator in the air discharge device according to the sixth embodiment.

As shown in FIG. 33, the block body 732 includes a main body 732a and a support part 732b which has a bar shape and supports the main body 732a. The main body 732a is located closer to the center of the upstream main flow path 510D than the support part 732b. More specifically, the main body 732a has a circular shape when viewed from a front and a quadrangular shape when viewed from a side. The support part 732b is fixed to the inner wall surface of the upstream duct 51B.

The other configurations are the same as those of the fifth embodiment. The air discharge device 50 of the present embodiment can obtain the action and effect produced by the configuration of the fifth embodiment in the same manner as in the fifth embodiment.

Modification of Sixth Embodiment

In the sixth embodiment described above, an example in which the block body 732 includes the main body 732a formed in a disk-shape has been described, however, the block body 732 is not limited to this. For example, the block body 732 may include a main body formed in a sphere shape, a main body formed in an octahedral shape, or a main body formed in a hexahedral shape.

Seventh Embodiment

Next, a seventh embodiment will be described with reference to FIGS. 34 and 35. In the present embodiment, portions different from those of the first embodiment will be described.

Figure 34:
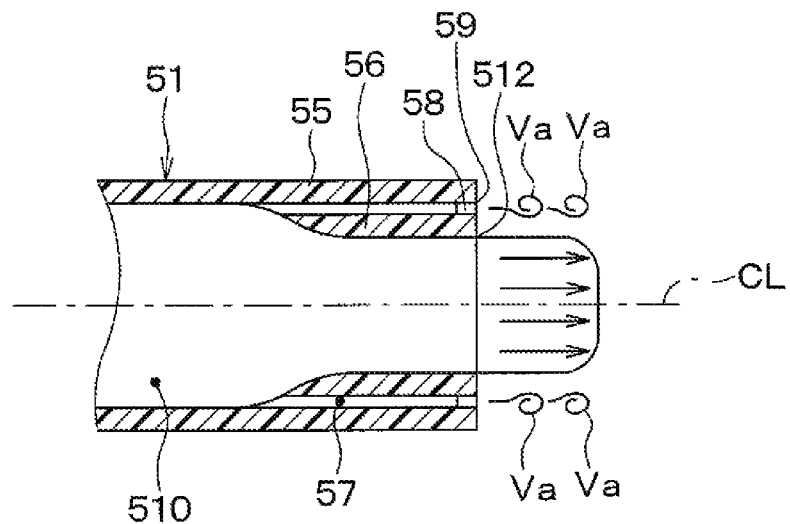
FIG. 34 is a schematic cross-sectional view showing a part of an air discharge device according to a seventh embodiment.
Figure 35:
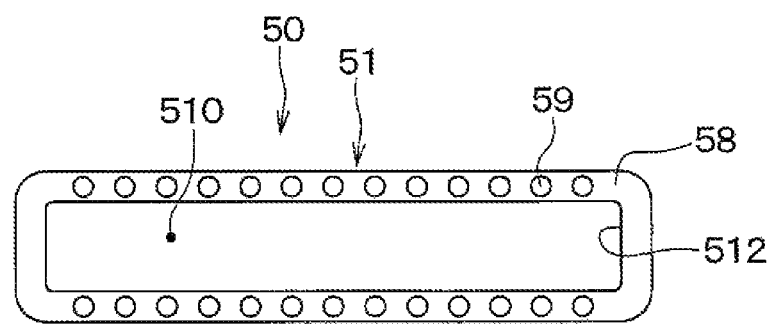
FIG. 35 is a schematic front view of the air discharge device according to the seventh embodiment.

As shown in FIGS. 34 and 35, the duct 51 is made of a double pipe structure at a portion connected to the main hole 512, including an outer wall portion 55 and an inner wall portion 56.

The outer wall portion 55 forms a part of an outer shell of the duct 51. The outer wall portion 55 has a shape corresponding to the inner wall portion 56 so as to form a substantially constant gap between the outer wall portion 55 and the inner wall portion 56. The inner wall portion 56 forms the main flow path 510 and the main hole 512 and is arranged at an inner side of the outer wall portion 55.

An auxiliary flow path 57 is formed between the outer wall portion 55 and the inner wall portion 56 such that the air in the auxiliary flow path 57 flows in parallel with the air flowing in the main flow path 510. A part of the air flowing in the main flow path 510 flows into the auxiliary flow path 57.

The outer wall portion 55 and the inner wall portion 56 are connected to each other by a connecting wall portion 58. The connecting wall portion 58 is arranged at an end forming the main hole 512 at a downstream side. The connecting wall portion 58 is arranged at an outer peripheral side surrounding the main hole 512.

A plurality of auxiliary outlets 59 are arranged at the connecting wall portion 58 so as to blow out the auxiliary vortex Va which has the vortex characteristic including the vortex rotation direction and the vortex axis direction, different from that of the transverse vortex generated downstream from the main hole 512. An opening of the auxiliary outlet 59 is smaller than that of the main hole 512. The multiple auxiliary outlets 59 are arranged around the main hole 512 at the connecting wall portion 58.

More specifically, the auxiliary outlets 59 are arranged at an entire connecting wall portion 58 through predetermined spaces. The opening of the auxiliary outlet 59 has a circular shape. The auxiliary outlet 59 may be formed in a part of the connecting wall portion 58. The opening shape of the auxiliary outlet 59 may be a shape other than the circular shape.

The duct 51 configured as above includes the auxiliary flow path 57. Therefore, a part of the air flowing in the main flow path 510 flows into the auxiliary flow path 57. The air flowing in the auxiliary flow path 57 is discharged from the auxiliary outlet 59. At this point, the auxiliary vortex Va, which has at least one of the vortex rotation direction and the vortex axis direction different from that of the transverse vortex, is generated. Therefore, the auxiliary vortex Va collides with the transverse vortex at the downstream from the main hole 512, and the transverse vortex can be disturbed. In addition, the auxiliary vortex Va collides with the transverse vortexes, and development of the transverse vortex can be suppressed.

The other configurations are the same as those of the first embodiment. The other parts of the air discharge device 50 according to the present embodiment have same configurations as that of the first embodiment. Therefore, the action and effect produced by the configuration of the first embodiment can be obtained in the same manner as in the first embodiment.

In the present embodiment, because of the auxiliary outlet 59, the auxiliary vortex Va collides with the transverse vortex at the downstream from the main hole 512, and the transverse vortex can be disturbed. In addition, the auxiliary vortex Va collides with the transverse vortexes, and development of the transverse vortex can be suppressed. Therefore, it is difficult to form the vortex street in which the vortexes are arranged in the staggered pattern downstream from the main hole 512, and the air flow downstream from the main hole 512 is restricted from meandering.

Other Embodiments

The representative embodiments of the present disclosure have been described above. However, the present disclosure is not limited to the above-described embodiments, and may be variously modified as follows.

In the above embodiments, the opening of the main hole 512 has a rectangular shape, however, the present disclosure is not limited to this. The shape of the main hole 512 may be, for example, an elliptical shape formed by combining arcs and straight lines, an elliptical shape formed by connecting curved lines having large curvature radius and a small curvature radius, a polygonal shape such as hexagons formed by connecting straight lines, or a rectangular shape with rounded corners. The shapes of the pair of long edges 512a, 512b and the pair of short edges 512c, 512d that form main hole 512 are not limited to straight lines or arc shapes, and may be straight lines or arc shapes with roughness, respectively.

In the above embodiments, the main flow path 510 is divided to the three paths including the pair of side flow paths 510A, 510B and the center flow path 510C by the first partition 52 and the second partition 53, however, the present disclosure is not limited to this. The main flow path 510 may be, for example, divided to equal to or more than four paths by three partitions or more. In this case, flow paths located on both sides in the width direction DRw form a pair of side flow paths, and multiple flow paths between the pair of side flow paths form center flow paths.

In the above embodiments, an example in which the width expanding portion 516 is provided in the duct 51 has been described, however, the present disclosure is not limited to this. The width expanding portion 516 may not be provided at the duct 51.

In the above embodiment, the duct 51 includes the upstream flat portion 513, the downstream flat portion 514, and the throttle portion 515, however, the present disclosure is not limited to this. In the duct 51, for example, one of the upstream flat portion 513 or the downstream flat portion 514 may be omitted.

In the above embodiments, the upstream end 521, 531 of the partition 52, 53 is located downstream from the upstream end of the upstream flat portion 513, and the downstream end 522, 532 of the partition 52, 53 is located upstream from the downstream end of the throttle portion 515; however, the present disclosure is not limited to this. The partition 52, 53 may be, for example, located such that the upstream end 521, 531 of the partition 52, 53 is positioned upstream from the upstream end of the upstream flat portion 513. In addition, the partition 52, 53 may be located such that the downstream end 522, 532 is positioned downstream from the downstream end of the throttle portion 515.

In the above embodiments, a flow path area of the upstream main flow path 510D is changed by the flow path variable machine 60, and the air flow is discharged as the pulsatile flow from the main hole 512, however, the air discharge device 50 is not limited to this. In the air discharge device 50, for example, the blower 8 may be operated intermittently to discharge the air flow as the pulsatile flow from the main hole 512. In this case, the blower 8 is configured as the pulsatile flow generator.

In the above embodiments, the air discharge device 50 of the present disclosure is applied to the air outlet of the indoor air conditioning unit 1, however, an applicable target of the air discharge device 50 is not limited to this. The air discharge device 50 in this disclosure is widely applicable to an air outlet of an installed air conditioning unit for a home use or the like, not only a moving body such as the vehicle. In addition, the air discharge device 50 in this disclosure is widely applicable to, for example, an air outlet of a humidifying device which humidifies a room, an air outlet of a temperature adjusting device which blows a temperature adjusted air to adjust a temperature of a heat generator or the like, or the like, not only the air conditioning unit to condition air in a room.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like.

Overview

According to a first aspect described in a part or all of the above embodiments, an air discharge device includes a throttle portion and multiple partitions in a duct. A flow path height of the throttle portion is reduced from an upstream to a downstream of an air flow. The multiple partitions is configured to divide a main flow path in a major direction. The main flow path is divided by the multiple partitions into a pair of side flow paths located at the both sides in the major direction, and at least one center flow path located between the pair of side flow paths. The flow path width of the throttle portion is reduced gradually from the upstream of the air flow toward the downstream of the air flow.

According to a second aspect, a height expanding portion is arranged at a position connected to a main hole and located downstream of the air flow from the throttle portion in the duct. The flow path height of the height expanding portion is enlarged as toward the downstream of the air flow. In the configuration including the height expanding portion, the air flowing along the portions connected to the main hole of the duct flows so as to be away from a central line in a minor direction of an opening of the main hole. According to this, stationary fluid at the outside of the duct is easily entrained at the position away from a center of the opening of the main hole, and a flow velocity of the air flowing in a center area of the opening of the main hole can be restricted from being reduced. Therefore, a reaching distance of the working air can be increased.

According to a third aspect, the air discharge device includes a width expanding portion that is provided in the duct at the position connected to the main hole. A flow path width of the width expanding portion is enlarged toward the downstream of the air flow. In the configuration including the width expanding portion as described above, the air flowing along portions connected to the main hole of the duct flows so as to be away from the central line in the major direction of the opening of the main hole. According to this, the stationary fluid at the outside of the duct at the position away from the center of the opening of the main hole is relatively easily entrained, and the flow velocity of the air flowing in the center area of the opening of the main hole can be restricted from being reduced. Therefore, the reaching distance of the working air can be increased.

According to a fourth aspect of the air discharge device, each of the multiple partitions has a streamlined shape in a cross-section along a flow direction of the air flowing through the main flow path. In this case, by forming each of the multiple partitions in a streamlined shape, the air flow is restricted from being away from the wall surfaces of the multiple partitions. Therefore, an air flow disturbance caused due to the multiple partitions can be effectively reduced. The above is effective to increase the reaching distance of the working air.

According to a fifth aspect of the air discharge device, the downstream ends of the multiple partitions at the downstream side of the air flow is located upstream of the air flow from the position of the opening of the main hole. According to this, the air flow discharged from the main hole is not disturbed by the multiple partitions, and the attenuation of the flow velocity of the working air can be sufficiently suppressed. In addition, the opening area of the main hole is not reduced by the partition.

According to a sixth aspect, the main flow path includes an upstream main flow path located upstream from the multiple partitions. In the upstream main flow path, a pulsatile flow generator is arranged so as to discharge the air flow as the pulsatile flow from the main hole. Here, the "pulsatile flow" is a flow accompanied by periodic or irregular fluctuation. The "pulsatile flow" is not limited to a flow flowing in a constant direction, and also includes a flow in which a flow direction is reversed.

When the air flow discharged from the main hole becomes the pulsatile flow, a generated position of the transverse vortex, a size of the transverse vortex, or the like at the downstream from the main hole are changed. Therefore, the vortex street in which the vortexes are arranged in the staggered pattern is suppressed to be formed downstream from the main hole, and the air flow downstream from the main hole is restricted from meandering. Therefore, according to the air discharge device in the present perspective, the reaching distance of the air flow discharged from the main hole can be increased.

According to a seventh aspect, the pulsatile flow generator includes a flow path variable machine configured to change a flow path area of the upstream main flow path. According to this, the flow path area of the upstream main flow path is changed by the flow path variable machine, and the air flow can be discharged from the main hole as the pulsatile flow.

According to an eighth aspect, the flow path variable machine is enabled to change the flow path area of the upstream main flow path such that a flow path throat, at which the flow path area of the upstream main flow path is smallest, is formed between the reducing slope and the enlarging slope, so as to reduce the flow path area of the upstream main flow path.

According to this, when the flow path area of the upstream main flow path is changed by the flow path variable machine, the air flowing from a reducing slope toward the flow path throat becomes the contraction flow. Therefore, a flow velocity difference of the main flow between the vicinity of the center and a vicinity of an inner wall surface of the duct becomes small. Because of this, a thickness of a velocity boundary layer formed around the inner wall surface of the duct can be reduced. In addition, when the flow path area of the main flow path is changed by the flow path variable machine, an enlarging slope is formed. According to this, the velocity boundary layer of the air flow away from the central line of the main hole is easily formed in accordance with the shape of the inner wall surface of the duct. Therefore, the air can flow stably into the pair of side flow paths and the center flow path. It is effective to improve the reaching distance of the air flow discharged from the main hole.

According to a ninth aspect, a flow path variable portion of the duct, at which the flow path area is changed by the flow path variable machine, is made of a material which has elasticity. When reducing the flow path area of the upstream main flow path, at least a part of the flow path variable portion is deformed so as to approach the central line of the upstream main flow path.

As described above, the flow path variable machine is configured such that at least a part of an inner wall surface of the flow path variable portion is deformed so as to approach the central line of the main flow path. In this case, a flow velocity distribution of the air flow is restricted to be biased at the downstream from the flow path variable portion. Therefore, the air can flow stably into the pair of side flow paths and the center flow path.

According to a tenth aspect, a rectifying structure is provided between the pulsatile flow generator and the multiple partitions and configured to rectify the air flow passing through the upstream main flow path.

When the flow path area of the upstream main flow path is changed by the flow path variable machine, the flow velocity distribution of the air flow is restricted from being biased at the downstream from the pulsatile flow generator. If the flow velocity distribution is biased, the air flowing in the duct is not stable, and the reaching distance of the air flow discharged from the main hole may be reduced. On the other hand, in a case that the rectifying structure is arranged between the pulsatile flow generator and the multiple partitions, the air can flow stably into the pair of side flow paths and the center flow path.

According to an eleventh aspect, the rectifying structure includes a reducing portion at which the flow path area of the upstream main flow path is reduced toward the downstream. Because of this, the air flow passing through the reducing portion is contracted, and the flow velocity difference of the main flow between the vicinity of the center and the vicinity of the inner wall surface defining the duct becomes small. Because of this, the thickness of the velocity boundary layer formed around the inner wall surface of the duct can be reduced. As a result, the air can flow stably into the pair of side flow paths and the center flow path.

According to a twelfth aspect, the rectifying structure includes a vortex generator arranged at the inner wall surface of the duct. The vortex generator is configured to generate an auxiliary vortex which has a vortex characteristic including a vortex rotation direction and a vortex axis direction, different from that of a transverse vortex generated downstream from the main hole.

Because of this, when the air passes around the vortex generator, the auxiliary vortex in which at least one of the rotational direction of the vortex and the direction of the vortex axis is different from that of the transverse vortex is generated. In the above configuration, because the air flowing in the duct is rectified by the auxiliary vortex, the thickness of the velocity boundary layer formed around the inner wall surface of the duct can be reduced. Therefore, the air can flow stably into the pair of side flow paths and the center flow path. Here, the vortex characteristic indicates a vortex flow state including the vortex rotation direction, the vortex axis direction, a vortex flow velocity, a fluid viscosity, a vortex radius, and the like.

According to a thirteenth aspect, an auxiliary outlet is arranged at the duct so as to discharge the auxiliary vortex which has the vortex characteristic including the vortex rotation direction and the vortex axis direction, different from that of the transverse vortex generated downstream from the main hole. According to this, the auxiliary vortex collides with the transverse vortex at the downstream from the main hole, and the transverse vortex can be disturbed. In addition, the auxiliary vortex collides with the transverse vortexes, and the development of the transverse vortex can be suppressed. Therefore, the vortex street in which the vortexes are arranged in the staggered pattern is suppressed to be formed downstream from the main hole, and the air flow downstream from the main hole is restricted from meandering.

What is claimed is:

1. An air discharge device comprising:
    a duct defining a main flow path through which an air flow passes, and a main hole having an opening and configured to discharge the air flow as a working air flow toward a downstream from the main flow path, the opening of the main hole having a flow path height in a minor direction of the opening and a flow path width in a major direction of the opening;
    a throttle portion provided in the duct to reduce the flow path height of the main flow path from an upstream of the air flow toward the downstream of the air flow; and
    a plurality of partitions arranged to divide the main flow path into a pair of side flow paths located at both sides in the major direction, and at least one center flow path located between the pair of side flow paths, wherein
    the plurality of partitions are disposed in the duct, and the flow path width of the center flow path is reduced from the upstream of the air flow toward the downstream of the air flow,
    the duct has a duct part made of a double pipe structure including an outer wall portion and an inner wall portion, at a portion connected to the main hole,
    the throttle portion is provided in the inner wall portion, and
    an upstream end of each of the plurality of partitions is provided at positions separated from the inner wall portion.
2. The air discharge device according to claim 1, wherein each of downstream ends of the plurality of partitions at the downstream of the air flow is located upstream of the air flow from an opening of the main hole.
3. The air discharge device according to claim 1, further comprising an auxiliary outlet arranged at the duct and configured to discharge an auxiliary vortex that has a vortex characteristic including a vortex rotation direction and a vortex axis direction, different from that of a transverse vortex generated downstream from the main hole.
4. The air discharge device according to claim 1, wherein a distance between upstream ends of adjacent partitions of the plurality of partitions and a distance between downstream ends of adjacent partitions of the plurality of partitions are unequal.
5. The air discharge device according to claim 1, wherein each of the plurality of partitions extend longer than the inner wall portion.
6. The air discharge device according to claim 1, wherein the duct includes an introduction hole configured to introduce the air flow into the main flow path and each of the plurality of partitions extend from the introduction hole to the main hole.
7. An air discharge device comprising:
    a duct defining a main flow path through which an air flow passes, and a main hole having an opening and configured to discharge the air flow as a working air flow toward a downstream from the main flow path;
    a throttle portion provided in the duct to reduce the main flow path in a minor direction of the opening from an upstream of the air flow toward the downstream of the air flow; and
    a plurality of partitions arranged to divide the main flow path in a major direction of the opening into a pair of side flow paths located at both sides in the major direction and a center flow path located between the pair of side flow paths, wherein
    the plurality of partitions are disposed in the duct, and a dimension of the center flow path in the major direction of the opening is reduced from the upstream toward the downstream of the air flow,
    the duct has a duct part made of a double pipe structure including an outer wall portion and an inner wall portion, at a portion connected to the main hole,
    the throttle portion is provided in the inner wall portion, and
    an upstream end of each of the plurality of partitions is provided at positions separated from the inner wall portion.
8. The air discharge device according to claim 7, wherein the inner wall portion is provided to define the main flow path and the main hole, and is arranged at an inner side of the outer wall portion to define an auxiliary flow path between the inner wall portion and the outer wall portion, and
    the auxiliary flow path is a substantially constant gap between the inner wall portion and the outer wall portion, and a part of the air flow passing through the main flow path flows through the auxiliary flow path in parallel with the air flow passing through the main flow path.
9. The air discharge device according to claim 8, wherein the outer wall portion and the inner wall portion are connected by a connecting wall portion arranged to surround the main hole, and
    a plurality of auxiliary outlets are provided at least in a part of the connecting wall portion, to discharge an air flow different from the working air flow.
10. The air discharge device according to claim 8, wherein the inner wall portion is configured to define the throttle portion.
11. The air discharge device according to claim 8, wherein the outer wall portion and the inner wall portion are connected by a connecting wall portion arranged at an outer peripheral side surrounding the main hole, and
    the connecting wall portion having a plurality of auxiliary outlets formed therein and arranged around the main hole at predetermined spaces.
12. The air discharge device according to claim 11, wherein
    an area of each of the plurality of auxiliary outlets is smaller than an area of the main hole.

13. The air discharge device according to claim 7, wherein an auxiliary flow path is formed between the outer wall portion and the inner wall portion and a part of the air flowing through the main flow path flows through the auxiliary flow path in parallel with the air flowing through the main flow path.

14. The air discharge device according to claim 7, wherein a distance between upstream ends of adjacent partitions of the plurality of partitions and a distance between downstream ends of adjacent partitions of the plurality of partitions are unequal.

15. The air discharge device according to claim 7, wherein the duct includes an introduction hole configured to introduce the air flow into the main flow path and each of the plurality of partitions extend from the introduction hole to the main hole.

* * * * *